(12) United States Patent
Laitinen et al.

(10) Patent No.: US 12,587,781 B2
(45) Date of Patent: Mar. 24, 2026

(54) PARAMETRIC SPATIAL AUDIO RENDERING WITH NEAR-FIELD EFFECT

(71) Applicant: Nokia Technologies Oy, Espoo (FI)

(72) Inventors: Mikko-Ville Laitinen, Espoo (FI); Mikko Tammi, Tampere (FI); Juha Vilkamo, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 268 days.

(21) Appl. No.: 18/027,249

(22) PCT Filed: Aug. 30, 2021

(86) PCT No.: PCT/FI2021/050581
§ 371 (c)(1),
(2) Date: Mar. 20, 2023

(87) PCT Pub. No.: WO2022/064100
PCT Pub. Date: Mar. 31, 2022

(65) Prior Publication Data
US 2023/0362537 A1 Nov. 9, 2023

(30) Foreign Application Priority Data
Sep. 22, 2020 (GB) ..................................... 2014951

(51) Int. Cl.
*H04R 1/40* (2006.01)
*G01S 3/803* (2006.01)
(Continued)

(52) U.S. Cl.
CPC ........... *H04R 1/406* (2013.01); *H04R 29/005* (2013.01); *H04S 7/30* (2013.01); *G01S 3/8036* (2013.01);
(Continued)

(58) Field of Classification Search
CPC ....... G10L 19/008; H04R 1/406; H04R 3/005; H04R 29/005; H04R 2201/401;
(Continued)

(56) References Cited

U.S. PATENT DOCUMENTS

| | | | |
|---|---|---|---|
| 10,609,503 B2 | 3/2020 | Stein | 7/303 |
| 2009/0252356 A1 | 10/2009 | Goodwin et al. | 381/310 |

(Continued)

FOREIGN PATENT DOCUMENTS

| | | | |
|---|---|---|---|
| EP | 3383067 A1 | 10/2018 | |
| GB | 2571949 A * | 9/2019 | G10L 19/008 |

OTHER PUBLICATIONS

Spagnol, S. et al., "Distance rendering and perception of nearby virtual sound sources with a near-field model," Applied Acoustics, vol. 115, 2017, pp. 61-73.

*Primary Examiner* — Carolyn R Edwards
*Assistant Examiner* — Kuassi A Ganmavo
(74) *Attorney, Agent, or Firm* — McCarter & English, LLP

(57) ABSTRACT

An apparatus including circuitry configured to: obtain two or more audio signals, wherein each audio signal is associated with a microphone array; obtain at least one value associated with an inter-channel difference based on the two or more audio signals; obtain at least one parameter value associated with the two or more audio signals; obtain at least one value associated with an inter-aural difference based at least on the at least one parameter value; generate at least two output audio signals by controlling inter-aural level differences of the generated at least two output audio signals based on the at least one value associated with the inter-channel difference and the at least one value associated with the inter-aural difference, such that sounds nearer to the microphone array
(Continued)

Obtain transport audio signals 1101

Obtain spatial metadata 1102

Obtain energy information associated with transport audio signals 1104

Time-Frequency domain transform transport audio signals 1103

Spatially synthesize time-frequency domain binaural audio signals 1105

Energy analyse time-frequency domain binaural audio signals 1109

Apply near-field energy adjustment of time-frequency domain binaural audio signals 1111

Inverse Time-Frequency domain transform near-field energy adjusted audio signals 1113

Output adjusted binaural audio signals 1115 are reproduced with a higher inter-aural difference at the at least two output audio signals.

20 Claims, 14 Drawing Sheets

(51) Int. Cl.

| | |
|---|---|
| *G10L 19/008* | (2013.01) |
| *H04R 29/00* | (2006.01) |
| *H04S 3/00* | (2006.01) |
| *H04S 7/00* | (2006.01) |

(52) U.S. Cl.
CPC ...... *G10L 19/008* (2013.01); *H04R 2201/401* (2013.01); *H04S 3/008* (2013.01); *H04S 2400/01* (2013.01); *H04S 2400/15* (2013.01); *H04S 2420/01* (2013.01); *H04S 2420/03* (2013.01)

(58) Field of Classification Search
CPC . H04S 7/302; H04S 3/008; H04S 7/30; H04S 2400/01; H04S 2400/15; H04S 2420/01; H04S 2420/03; G01S 3/8036
See application file for complete search history.

(56) References Cited

U.S. PATENT DOCUMENTS

| | | | | |
|---|---|---|---|---|
| 2010/0086136 | A1* | 4/2010 | Beckmann | H04S 7/30 |
| | | | | 381/17 |
| 2011/0299702 | A1* | 12/2011 | Faller | H04S 7/30 |
| | | | | 381/92 |
| 2015/0030179 | A1* | 1/2015 | Zhang | H04R 3/005 |
| | | | | 381/92 |
| 2015/0049872 | A1* | 2/2015 | Virette | G10L 19/008 |
| | | | | 381/23 |
| 2017/0094440 | A1* | 3/2017 | Brown | H04S 1/007 |
| 2017/0195811 | A1* | 7/2017 | Yen | H04R 29/001 |
| 2017/0236521 | A1* | 8/2017 | Chebiyyam | G10L 19/0212 |
| | | | | 381/2 |
| 2018/0103327 | A1* | 4/2018 | Mosgaard | H04R 25/554 |
| 2018/0301154 | A1* | 10/2018 | Briand | G10L 19/008 |
| 2019/0066701 | A1* | 2/2019 | Fatus | G10L 19/008 |
| 2019/0174246 | A1* | 6/2019 | De Bruijn | G06F 3/012 |
| 2019/0208348 | A1* | 7/2019 | Reijniers | H04R 5/02 |
| 2019/0215638 | A1* | 7/2019 | Stein | G10L 19/167 |
| 2020/0286495 | A1* | 9/2020 | Norvell | G10L 19/008 |

* cited by examiner

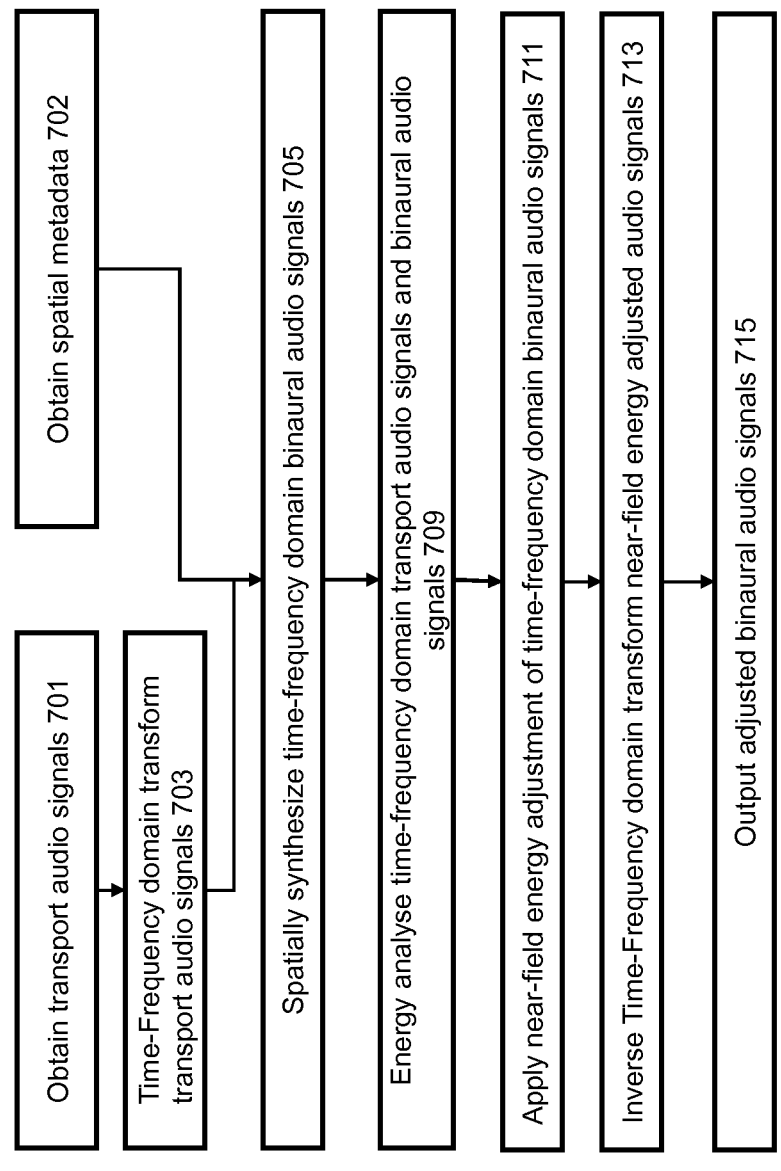

Figure 7

Obtain transport audio signals 701

Time-Frequency domain transform transport audio signals 703

Obtain spatial metadata 702

Spatially synthesize time-frequency domain binaural audio signals 705

Energy analyse time-frequency domain transport audio signals and binaural audio signals 709

Apply near-field energy adjustment of time-frequency domain binaural audio signals 711

Inverse Time-Frequency domain transform near-field energy adjusted audio signals 713

Output adjusted binaural audio signals 715

PARAMETRIC SPATIAL AUDIO RENDERING WITH NEAR-FIELD EFFECT

FIELD

The present application relates to apparatus and methods for audio rendering with near-field effect, but not exclusively for spatial audio rendering with near-field effect systems.

BACKGROUND

Spatial audio capture approaches attempt to capture an audio environment such that the audio environment can be perceptually recreated to a listener in an effective manner and furthermore may permit a listener to move and/or rotate within the recreated audio environment. Parametric spatial audio signal refers to one or more audio channel signals with associated spatial metadata, where the metadata indicates how to reproduce the audio spatially. For example, the spatial metadata may involve one or more direction parameters in frequency bands, and additionally energy ratio parameters indicating how directional or non-directional the sound is at frequency bands. Further parameters may involve indications of source width, spatial coherences, and any other suitable descriptors related to the spatial aspects of the sound. Typically, the spatial parameters are determined in the time-frequency domain, i.e., each parameter value is associated with a certain frequency band and temporal frame.

Other parametrizations than those described above may be used. In general, the spatial audio parametrizations describe how the sound is distributed in space, either generally (e.g., using directions) or relatively (e.g., as level differences between certain channels). Moreover, it should be noted that the audio and the parameters may be processed and/or transmitted/stored in between the analysis and the synthesis.

A parametric spatial audio signal may be rendered to various outputs. For example, it may be rendered to multichannel loudspeaker setups by use of amplitude panning in frequency bands (based on the direction parameter), and suitable decorrelating procedures to render the non-directional part spatially incoherently. Similarly, a binaural rendering of a parametric spatial audio signal may be performed by use of head-related transfer functions (HRTFs) based on the direction parameters, and by suitable mixing and/or decorrelating procedures to account for the directionality or non-directionality of the sound at frequency bands. The rendering of a parametric audio signal to various outputs has been exemplified, for example, in WO2019086757. While parametric rendering in general enables a multitude of output signal types (e.g. binaural, loudspeakers), the key focus point in the present invention is the binaural output, since the reproducing near-sources is most relevant in that context.

Parametric spatial sound may be captured using microphone arrays. Parametric capture and reproduction typically means analysing perceptually relevant parameters in frequency bands, for example, the directionality of the propagating sound at the recording position, and reproducing spatial sound in a perceptual sense at the rendering side according to the estimated spatial parameters. By estimating and reproducing the perceptually relevant spatial properties (parameters) of the sound field, a spatial perception similar to that which would occur in the original sound field can be reproduced. As the result, the listener can perceive the multitude of sources, their directions and distances, as well as properties of the surrounding physical space, among the other spatial sound features, as if the listener was in the position of the capture device.

An example binaural spatial-audio-reproduction method (such as described in EP3542546, US20120128174, US20130044884, EP3320692, EP3320699), called spatial audio capture (SPAC), processes captured microphone-array signals. It estimates the directions of arrival (DOA) and the relative energies of the direct and ambient components, expressed as direct-to-total energy ratios, from the microphone signals in frequency bands, and synthesizes the binaural output for headphone listening or other spatial output.

SUMMARY

There is provided according to a first aspect an apparatus comprising means configured to: obtain two or more audio signals, wherein each audio signal is associated with a microphone array; obtain at least one value associated with an inter-channel difference based on the two or more audio signals; obtain at least one parameter value associated with the two or more audio signals; obtain at least one value associated with an inter-aural difference based at least on the at least one parameter value; generate at least two output audio signals by controlling inter-aural level differences of the generated at least two output audio signals based on the at least one value associated with the inter-channel difference and the at least one value associated with the inter-aural difference, such that sounds nearer to the microphone array are reproduced with a higher inter-aural difference at the at least two output audio signals.

The means configured to generate at least two output audio signals may be configured to: compare the at least one value associated with the inter-channel difference and the at least one value associated with the inter-aural difference; and generate at least two output audio signals based on the comparison such that the at least two output audio signals are configured to represent a more accurate distance, from the microphone array, of a sound source within the two or more audio signals.

The means configured to obtain the at least one value associated with the inter-aural difference may be configured to: generate at least two further audio signals based on the two or more audio signals and the at least one parameter value for the at least two or more audio signals; obtain the at least one value associated with the inter-aural difference based on the two or more further audio signals.

The means configured to obtain at least one parameter value associated with the at least two or more audio signals may be configured to obtain at least one direction associated with the two or more audio signals.

The apparatus configured to obtain at least one value associated with the inter-aural difference based on the at least one parameter value may be configured to: determine a head-related transfer function (HRTF) corresponding to the at least one direction associated with the two or more audio signals; determine the at least one value associated with the inter-aural difference based on at least the determined head-related transfer function (HRTF).

The means configured to compare the at least one value associated with the inter-channel difference and the at least one value associated with the inter-aural difference may be configured to determine a maximum of the at least one value associated with the inter-aural level difference and the at least one value associated with the inter-channel level difference.

The means configured to generate at least two output audio signals based on the at least two further audio signals and the comparison may be configured to modify the at least two further audio signals such that when the at least one value associated with the inter-channel level difference is larger than the value associated with the inter-aural difference the at least two further audio signals are modified based on the at least one value associated with the inter-channel level difference.

The apparatus may comprise the microphone array comprising two or more microphones, and wherein the means configured to obtain the two or more audio signals may be configured to receive the two or more audio signals from the two or more microphones.

The means configured to obtain the two or more audio signals may be configured to receive two or more transport audio signals generated from the two or more audio signals from the microphone array.

The means configured to obtain at least one parameter value for the two or more audio signals may be configured to receive the at least one parameter value for the at least two or more audio signals.

The means configured to obtain the at least one value associated with the inter-channel difference based on the two or more audio signals may be configured to determine: at least one first energy value based on either one of the two or more audio signal associated with a left microphone or a selection of the two or more audio signal associated with left microphones; and at least one second energy value based on either one of the two or more audio signal associated with a right microphone or a selection of the two or more audio signal associated with right microphones.

The means configured to obtain at least one value associated with the inter-channel difference based on the two or more audio signals may be configured to determine: at least one first energy value based on a tuning factor multiplied by either one of the two or more audio signal associated with a left microphone or a selection of the two or more audio signal associated with left microphones; and at least one second energy value based on the tuning factor multiplied by either one of the two or more audio signal associated with a right microphone or a selection of the two or more audio signal associated with right microphones.

The means configured to obtain at least one value associated with the inter-aural difference based on the at least one parameter value may be configured to determine: at least one left channel binaural energy value; and at least one right channel binaural energy value.

The means configured to compare the at least one value associated with the inter-channel difference and the at least one value associated with the inter-aural difference may be configured to: determine which of at least one left and at least one right binaural channel has a higher energy; and compare the binaural energy of the determined channel and the energy value based on either one of the two or more audio signal associated with a determined channel microphone or a selection of the two or more audio signal associated with determined channel microphones.

The means configured to generate at least two output audio signals based on the comparison such that the at least two output audio signals are configured to represent a more accurate distance, from the microphone array, of a sound source within the two or more audio signals may be configured to determine at least one gain correction factor for a left or right further audio signal based on the comparison.

The means configured to determine the at least one gain correction factor based on the comparison may be configured to: determine a left further audio signal correction factor of a square root of the ratio between an energy value of the left channel and an energy value of the associated left binaural channel; and determine a right further audio signal correction factor of a square root of the ratio between an energy value of the right channel and an energy value of the associated right binaural channel.

The means may be configured to determine at least one distance of the sound source and the means configured to generate at least two output audio signals based on the at least two further audio signals and the comparison such that the at least two output audio signals are configured to represent a more accurate distance, from the microphones, of a sound source within the two or more audio signals may be configured to generate at least two output audio signals based on based on the at least one distance of the sound source.

The at least one value associated with the inter-channel difference may be at least one of: an energy of the two or more audio signals; an amplitude of the two or more audio signals; a value related to the amount of sound based on the two or more audio signals; a value related to the relative amount of sound at the two or more audio signals; at least one inter-channel energy level difference; and at least one inter-channel amplitude level difference.

The at least one inter-aural difference may be at least one of: a binaural energy value; a binaural amplitude value; a value related to an amount of binaural sound; a value related to a relative amount of binaural sound; at least one inter-aural energy level difference; and at least one inter-aural amplitude level difference.

The means configured to obtain at least one parameter value associated with the two or more audio signals may be configured to obtain spatial metadata associated with the two or more audio signals.

The means configured to obtain spatial metadata associated with the two or more audio signals may be configured to perform at least one of: analyse the two or more audio signals to determine the spatial metadata; and receive the spatial metadata associated the two or more audio signals.

The spatial metadata associated with the two or more audio signals may comprise at least one of: a direction value; and a value indicating the directionality related to the two or more audio signals.

The means configured to generate at least two output audio signals may be configured to generate binaural output audio signals.

According to a second aspect there is provided a method for an apparatus comprising: obtaining two or more audio signals, wherein each audio signal is associated with a microphone array; obtaining at least one value associated with an inter-channel difference based on the two or more audio signals; obtaining at least one parameter value associated with the two or more audio signals; obtaining at least one value associated with an inter-aural difference based at least on the at least one parameter value; generating at least two output audio signals by controlling inter-aural level differences of the generated at least two output audio signals based on the at least one value associated with the inter-channel difference and the at least one value associated with the inter-aural difference, such that sounds nearer to the microphone array are reproduced with a higher inter-aural difference at the at least two output audio signals.

Generating at least two output audio signals may comprise: comparing the at least one value associated with the inter-channel difference and the at least one value associated with the inter-aural difference; and generating at least two output audio signals based on the comparing such that the at least two output audio signals are configured to represent a more accurate distance, from the microphone array, of a sound source within the two or more audio signals.

Obtaining the at least one value associated with the inter-aural difference may comprise: generating at least two further audio signals based on the two or more audio signals and the at least one parameter value for the at least two or more audio signals; obtaining the at least one value associated with the inter-aural difference based on the two or more further audio signals.

Obtaining at least one parameter value associated with the at least two or more audio signals may comprise obtaining at least one direction associated with the two or more audio signals.

Obtaining at least one value associated with the inter-aural difference based on the at least one parameter value may comprise: determining a head-related transfer function (HRTF) corresponding to the at least one direction associated with the two or more audio signals; determining the at least one value associated with the inter-aural difference based on at least the determined head-related transfer function (HRTF).

Comparing the at least one value associated with the inter-channel difference and the at least one value associated with the inter-aural difference may comprise determining a maximum of the at least one value associated with the inter-aural level difference and the at least one value associated with the inter-channel level difference.

Generating at least two output audio signals based on the at least two further audio signals and the comparison may comprise modifying the at least two further audio signals such that when the at least one value associated with the inter-channel level difference is larger than the value associated with the inter-aural difference the at least two further audio signals are modified based on the at least one value associated with the inter-channel level difference.

The apparatus may comprise the microphone array comprising two or more microphones.

Obtaining the two or more audio signals may comprise receiving the two or more audio signals from the two or more microphones.

Obtaining the two or more audio signals may comprise receiving two or more transport audio signals generated from the two or more audio signals from the microphone array.

Obtaining at least one parameter value for the two or more audio signals may comprise receiving the at least one parameter value for the at least two or more audio signals.

Obtaining the at least one value associated with the inter-channel difference based on the two or more audio signals may comprise determining: at least one first energy value based on either one of the two or more audio signal associated with a left microphone or a selection of the two or more audio signal associated with left microphones; and at least one second energy value based on either one of the two or more audio signal associated with a right microphone or a selection of the two or more audio signal associated with right microphones.

Obtaining at least one value associated with the inter-channel difference based on the two or more audio signals may comprise determining: at least one first energy value based on a tuning factor multiplied by either one of the two or more audio signal associated with a left microphone or a selection of the two or more audio signal associated with left microphones; and at least one second energy value based on the tuning factor multiplied by either one of the two or more audio signal associated with a right microphone or a selection of the two or more audio signal associated with right microphones.

Obtaining at least one value associated with the inter-aural difference based on the at least one parameter value may comprise determining: at least one left channel binaural energy value; and at least one right channel binaural energy value.

Comparing the at least one value associated with the inter-channel difference and the at least one value associated with the inter-aural difference may comprise: determining which of at least one left and at least one right binaural channel has a higher energy; and comparing the binaural energy of the determined channel and the energy value based on either one of the two or more audio signal associated with a determined channel microphone or a selection of the two or more audio signal associated with determined channel microphones.

Generating at least two output audio signals based on the comparison such that the at least two output audio signals are configured to represent a more accurate distance, from the microphone array, of a sound source within the two or more audio signals may comprise determining at least one gain correction factor for a left or right further audio signal based on the comparison.

Determining the at least one gain correction factor based on the comparison may comprise: determining a left further audio signal correction factor of a square root of the ratio between an energy value of the left channel and an energy value of the associated left binaural channel; and determining a right further audio signal correction factor of a square root of the ratio between an energy value of the right channel and an energy value of the associated right binaural channel.

The method may comprise determining at least one distance of the sound source and generating at least two output audio signals based on the at least two further audio signals and the comparison such that the at least two output audio signals are configured to represent a more accurate distance, from the microphones, of a sound source within the two or more audio signals may comprise generating at least two output audio signals based on based on the at least one distance of the sound source.

The at least one value associated with the inter-channel difference may be at least one of: an energy of the two or more audio signals; an amplitude of the two or more audio signals; a value related to the amount of sound based on the two or more audio signals; a value related to the relative amount of sound at the two or more audio signals; at least one inter-channel energy level difference; and at least one inter-channel amplitude level difference.

The at least one inter-aural difference may be at least one of: a binaural energy value; a binaural amplitude value; a value related to an amount of binaural sound; a value related to a relative amount of binaural sound; at least one inter-aural energy level difference; and at least one inter-aural amplitude level difference.

Obtaining at least one parameter value associated with the two or more audio signals may comprise obtaining spatial metadata associated with the two or more audio signals.

Obtaining spatial metadata associated with the two or more audio signals may comprise at least one of: analysing the two or more audio signals to determine the spatial metadata; and receiving the spatial metadata associated the two or more audio signals.

The spatial metadata associated with the two or more audio signals may comprise at least one of: a direction value; and a value indicating the directionality related to the two or more audio signals.

Generating at least two output audio signals may comprise generating binaural output audio signals.

According to a third aspect there is provided an apparatus comprising at least one processor and at least one memory including a computer program code, the at least one memory and the computer program code configured to, with the at least one processor, cause the apparatus at least to: obtain two or more audio signals, wherein each audio signal is associated with a microphone array; obtain at least one value associated with an inter-channel difference based on the two or more audio signals; obtain at least one parameter value associated with the two or more audio signals; obtain at least one value associated with an inter-aural difference based at least on the at least one parameter value; generate at least two output audio signals by controlling inter-aural level differences of the generated at least two output audio signals based on the at least one value associated with the inter-channel difference and the at least one value associated with the inter-aural difference, such that sounds nearer to the microphone array are reproduced with a higher inter-aural difference at the at least two output audio signals.

The apparatus caused to generate at least two output audio signals may be caused to: compare the at least one value associated with the inter-channel difference and the at least one value associated with the inter-aural difference; and generate at least two output audio signals based on the comparison such that the at least two output audio signals are configured to represent a more accurate distance, from the microphone array, of a sound source within the two or more audio signals.

The apparatus caused to obtain the at least one value associated with the inter-aural difference may be caused to: generate at least two further audio signals based on the two or more audio signals and the at least one parameter value for the at least two or more audio signals; obtain the at least one value associated with the inter-aural difference based on the two or more further audio signals.

The apparatus caused to obtain at least one parameter value associated with the at least two or more audio signals may be caused to obtain at least one direction associated with the two or more audio signals.

The apparatus caused to obtain at least one value associated with the inter-aural difference based on the at least one parameter value may be caused to:

determine a head-related transfer function (HRTF) corresponding to the at least one direction associated with the two or more audio signals; determine the at least one value associated with the inter-aural difference based on at least the determined head-related transfer function (HRTF).

The apparatus caused to compare the at least one value associated with the inter-channel difference and the at least one value associated with the inter-aural difference may be caused to determine a maximum of the at least one value associated with the inter-aural level difference and the at least one value associated with the inter-channel level difference. The apparatus caused to generate at least two output audio signals based on the at least two further audio signals and the comparison may be caused to modify the at least two further audio signals such that when the at least one value associated with the inter-channel level difference is larger than the value associated with the inter-aural difference the at least two further audio signals are modified based on the at least one value associated with the inter-channel level difference.

The apparatus may comprise the microphone array comprising two or more microphones, and wherein the apparatus caused to obtain the two or more audio signals may be caused to receive the two or more audio signals from the two or more microphones.

The apparatus caused to obtain the two or more audio signals may be caused to receive two or more transport audio signals generated from the two or more audio signals from the microphone array.

The apparatus caused to obtain at least one parameter value for the two or more audio signals may be caused to receive the at least one parameter value for the at least two or more audio signals.

The apparatus caused to obtain the at least one value associated with the inter-channel difference based on the two or more audio signals may be caused to determine: at least one first energy value based on either one of the two or more audio signal associated with a left microphone or a selection of the two or more audio signal associated with left microphones; and at least one second energy value based on either one of the two or more audio signal associated with a right microphone or a selection of the two or more audio signal associated with right microphones.

The apparatus caused to obtain at least one value associated with the inter-channel difference based on the two or more audio signals may be caused to determine: at least one first energy value based on a tuning factor multiplied by either one of the two or more audio signal associated with a left microphone or a selection of the two or more audio signal associated with left microphones; and at least one second energy value based on the tuning factor multiplied by either one of the two or more audio signal associated with a right microphone or a selection of the two or more audio signal associated with right microphones.

The apparatus caused to obtain at least one value associated with the inter-aural difference based on the at least one parameter value may be caused to determine: at least one left channel binaural energy value; and at least one right channel binaural energy value.

The apparatus caused to compare the at least one value associated with the inter-channel difference and the at least one value associated with the inter-aural difference may be caused to: determine which of at least one left and at least one right binaural channel has a higher energy; and compare the binaural energy of the determined channel and the energy value based on either one of the two or more audio signal associated with a determined channel microphone or a selection of the two or more audio signal associated with determined channel microphones. The apparatus caused to generate at least two output audio signals based on the comparison such that the at least two output audio signals are configured to represent a more accurate distance, from the microphone array, of a sound source within the two or more audio signals may be caused to determine at least one gain correction factor for a left or right further audio signal based on the comparison. The apparatus caused to determine the at least one gain correction factor based on the comparison may be caused to: determine a left further audio signal correction factor of a square root of the ratio between an energy value of the left channel and an energy value of the associated left binaural channel; and determine a right further audio signal correction factor of a square root of the ratio between an energy value of the right channel and an energy value of the associated right binaural channel.

The apparatus may be caused to determine at least one distance of the sound source and the apparatus caused to generate at least two output audio signals based on the at least two further audio signals and the comparison such that the at least two output audio signals are configured to represent a more accurate distance, from the microphones, of a sound source within the two or more audio signals may be caused to generate at least two output audio signals based on based on the at least one distance of the sound source.

The at least one value associated with the inter-channel difference may be at least one of: an energy of the two or more audio signals; an amplitude of the two or more audio signals; a value related to the amount of sound based on the two or more audio signals; a value related to the relative amount of sound at the two or more audio signals; at least one inter-channel energy level difference; and at least one inter-channel amplitude level difference.

The at least one inter-aural difference may be at least one of: a binaural energy value; a binaural amplitude value; a value related to an amount of binaural sound; a value related to a relative amount of binaural sound; at least one inter-aural energy level difference; and at least one inter-aural amplitude level difference.

The apparatus caused to obtain at least one parameter value associated with the two or more audio signals may be caused to obtain spatial metadata associated with the two or more audio signals.

The apparatus caused to obtain spatial metadata associated with the two or more audio signals may be caused to perform at least one of: analyse the two or more audio signals to determine the spatial metadata; and receive the spatial metadata associated the two or more audio signals.

The spatial metadata associated with the two or more audio signals may comprise at least one of: a direction value; and a value indicating the directionality related to the two or more audio signals.

The apparatus caused to generate at least two output audio signals may be caused to generate binaural output audio signals.

According to a fourth aspect there is provided an apparatus comprising: means for obtaining two or more audio signals, wherein each audio signal is associated with a microphone array; means for obtaining at least one value associated with an inter-channel difference based on the two or more audio signals; means for obtaining at least one parameter value associated with the two or more audio signals; means for obtaining at least one value associated with an inter-aural difference based at least on the at least one parameter value; means for generating at least two output audio signals by controlling inter-aural level differences of the generated at least two output audio signals based on the at least one value associated with the inter-channel difference and the at least one value associated with the inter-aural difference, such that sounds nearer to the microphone array are reproduced with a higher inter-aural difference at the at least two output audio signals.

According to a fifth aspect there is provided a computer program comprising instructions [or a computer readable medium comprising program instructions] for causing an apparatus to perform at least the following: obtain two or more audio signals, wherein each audio signal is associated with a microphone array; obtain at least one value associated with an inter-channel difference based on the two or more audio signals; obtain at least one parameter value associated with the two or more audio signals; obtain at least one value associated with an inter-aural difference based at least on the at least one parameter value; generate at least two output audio signals by controlling inter-aural level differences of the generated at least two output audio signals based on the at least one value associated with the inter-channel difference and the at least one value associated with the inter-aural difference, such that sounds nearer to the microphone array are reproduced with a higher inter-aural difference at the at least two output audio signals.

According to a sixth aspect there is provided a non-transitory computer readable medium comprising program instructions for causing an apparatus to perform at least the following: obtain two or more audio signals, wherein each audio signal is associated with a microphone array; obtain at least one value associated with an inter-channel difference based on the two or more audio signals; obtain at least one parameter value associated with the two or more audio signals; obtain at least one value associated with an inter-aural difference based at least on the at least one parameter value; generate at least two output audio signals by controlling inter-aural level differences of the generated at least two output audio signals based on the at least one value associated with the inter-channel difference and the at least one value associated with the inter-aural difference, such that sounds nearer to the microphone array are reproduced with a higher inter-aural difference at the at least two output audio signals.

According to a seventh aspect there is provided an apparatus comprising: obtaining circuitry configured to obtain two or more audio signals, wherein each audio signal is associated with a microphone array; obtaining circuitry configured to obtain at least one value associated with an inter-channel difference based on the two or more audio signals; obtaining circuitry configured to obtain at least one parameter value associated with the two or more audio signals; obtaining circuitry configured to obtain at least one value associated with an inter-aural difference based at least on the at least one parameter value; generating circuitry configured to generate at least two output audio signals by controlling inter-aural level differences of the generated at least two output audio signals based on the at least one value associated with the inter-channel difference and the at least one value associated with the inter-aural difference, such that sounds nearer to the microphone array are reproduced with a higher inter-aural difference at the at least two output audio signals.

According to an eighth aspect there is provided a computer readable medium comprising program instructions for causing an apparatus to perform at least the following: obtain two or more audio signals, wherein each audio signal is associated with a microphone array; obtain at least one value associated with an inter-channel difference based on the two or more audio signals; obtain at least one parameter value associated with the two or more audio signals; obtain at least one value associated with an inter-aural difference based at least on the at least one parameter value; generate at least two output audio signals by controlling inter-aural level differences of the generated at least two output audio signals based on the at least one value associated with the inter-channel difference and the at least one value associated with the inter-aural difference, such that sounds nearer to the microphone array are reproduced with a higher inter-aural difference at the at least two output audio signals.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which:

FIG. 7 shows a flow diagram of the operations of the apparatus shown in FIG. 6 according to some embodiments;

EMBODIMENTS OF THE APPLICATION

Figure 1:
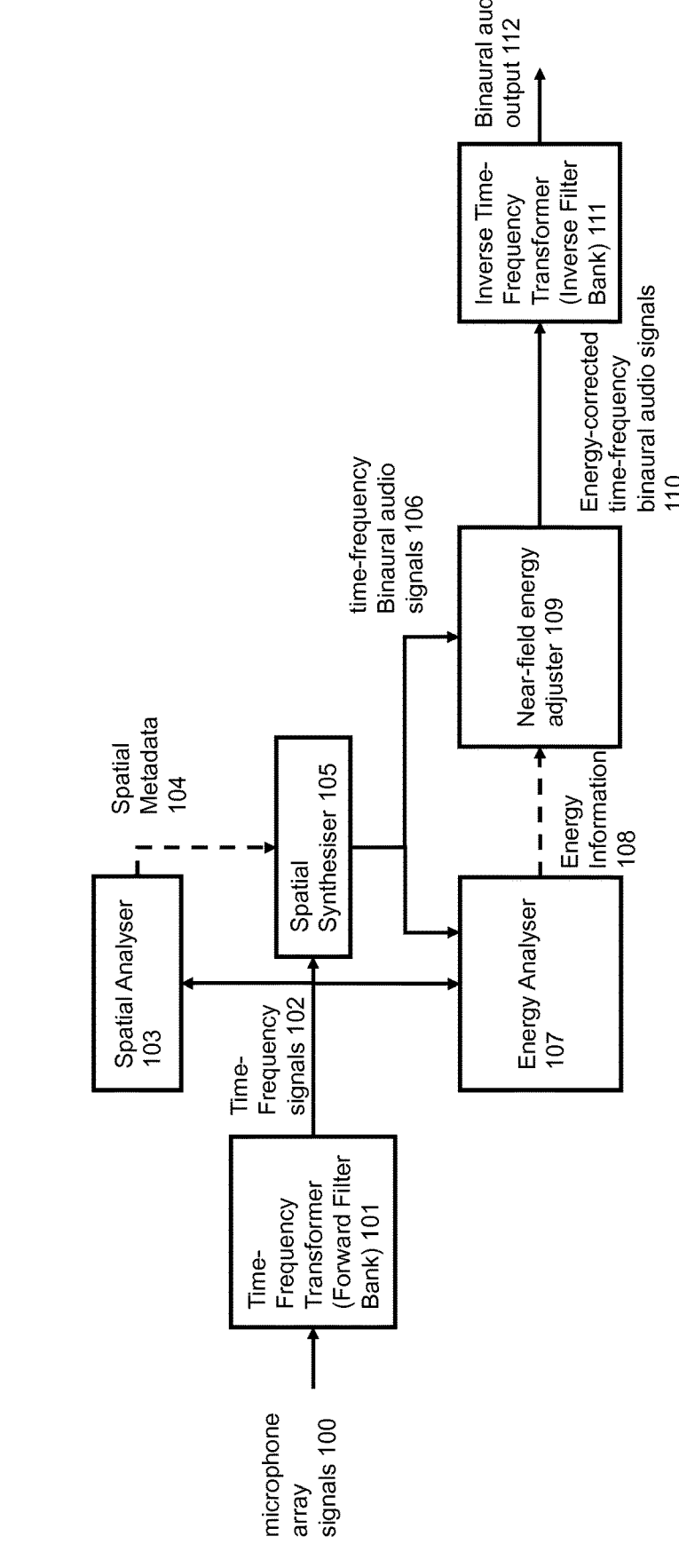
FIG. 1 shows schematically a system of apparatus suitable for implementing some embodiments.

The concept as discussed herein in further detail with respect to the following embodiments is related to parametric spatial audio rendering of perceptually accurate spatial audio signals obtained from microphone arrays.

The microphone arrays in some embodiments are microphone arrays mounted on mobile phones. Furthermore in some embodiments the rendering is configured to produce a binaural output.

The embodiments are configured to improve the parametric spatial audio capture and rendering so that the spatial rendering of near sources is enabled, additionally to the pre-existing ability to capture and render non-near sounds.

Since near-field distance perception of human hearing is predominantly based on inter-aural level differences, the embodiments are configured to estimate the needed inter-aural level differences for the output binaural signals based on the analysis of the microphone signals (by analysis of spatial metadata and level/energy differences between the microphone signals) and render the output binaural signals so that they have such inter-aural level differences. As a result, in some embodiments a binaural rendering is provided such that sounds that are near the array are perceived being near to the listener (and far-away sounds far-away), which improves the overall immersion of the captured spatial sound.

Capture apparatus or devices can be configured to determine the direction of the sound in frequency bands, and how directional the sound is in frequency bands (e.g., a direct-to-total energy ratio). Rendering apparatus or devices may then (re)produce output audio signals according to these parameters using head-related transfer functions (HRTFs) to generate a perceptually faithful (re)production of a sound scene. In such embodiments as described herein sound sources can be perceived at appropriate directions only at moderate and far distances.

At moderate and far distances (e.g., 1 meter), human hearing may detect the distance of a sound source based on the balance between direct and ambient sound and further based on the loudness of the sound. Thus, sound sources can be rendered to correct distances using the aforementioned direct-to-total energy ratio. Moreover, normal HRTFs, which are defined for sound sources originating from far field (e.g., 2 meters or more), can be used for rendering the sound, as the inter-aural features of the HRTFs do not change at this distance range.

Furthermore the embodiments as described herein are configured to attempt to accurately (re)produce a sound scene so that when a sound source is very 'near' to the user (or to the microphone array at the recording stage) then the apparatus is configured to render the audio signals such that the source is perceived to be near the listener. A near sound source may for example be a sound source 0.5 meters or closer to the user (or to the microphone array) array. At these distances, the inter-aural features of the HRTFs start to dominate the perception of distance, especially when the sound source is significantly to one side of the listener (human head). In such circumstances rendering the correct balance of direct and ambient sound does not produce the perception of correct distance. HRTFs are typically measured/simulated with the distance of at least 2 meters, which is a valid choice, since the inter-aural features of the HRTFs do not significantly change at mid and far distances. However at near field (e.g., 0.5 meters or less), the near-field HRTFs are different from the far-field HRTFs, especially when the sound source is on the side. This is because the relative distance difference from the source to the different ears becomes a significant factor (alongside shadowing) affecting the inter-aural level difference (ILD). In the front and back directions the near-field HRTFs are not in such a degree different than the far-field HRTFs.

As a result, spatial sound rendered with normal (far-field) HRTFs causes a perception of a sound source not being close when the sound source is on the side, regardless whether it should or should not be near. Although near-field HRTFs have been used, their application in parametric spatial audio rendering requires knowing the distance of the sounds to the array and they have not been proposed in parametric spatial audio capture and rendering methods for typical arrays such as mobile capture devices because of the difficulty of robustly estimating the distance parameter.

Furthermore, the embodiments as described herein attempt to overcome the need for further reliable distance determinations in order to know when to render the sound near or far. This, for example, would prevent the need for distance estimates to be determined in order to check that all sound sources are rendered at correct distances. Furthermore, if a distance parameter is not available, this would prevent all sources being rendered near (regardless of whether they are actually near or far) when using a near-field HRTF set, which is obviously not desired either.

In EP3643084 and EP3643079 means have been provided to estimate distance metadata in frequency bands additionally to the directional and ratio metadata. The distance was proposed to be estimated based on the fluctuation of the directional metadata, based on visual depth maps, and/or based on two arrays, two direction estimates, and finding nearest "crossing" points of lines from the arrays towards the directions.

The embodiments attempt to overcome the issues of requiring the use of these approaches, as they may not be able to provide a robust solution for rendering sounds at small distances. The distance estimates for example may not function well at short distances as the fluctuation of the directional metadata does not function well to estimate differences between sounds at for example 5 cm and sounds at 20 cm. These are extremely different distances for near-field perception, but not significantly different in terms of the fluctuation of the directional metadata. Thus, the method does not provide robust near-field distance estimates.

Visual depth maps may produce reliable distance estimates where available, but depth map information is not generally available for the vast majority of devices such as mobile phones with mounted microphone arrays. Furthermore, the depth map is required to cover the sides in order to assist near-field reproduction needs at the sides in particular (and typically mobile devices are not equipped with cameras directed to the side).

Furthermore, the cost of equipping an apparatus with two arrays is not an option for the vast majority of cases. For example, for bill of material purposes or physical spacing on the mobile phone.

As such, some embodiments attempt to provide apparatus suitable for implementing a spatial audio capture and spatial audio rendering method for microphone arrays that is able to render the sounds near and far, and is able to obtain suitable distance/position metadata (based on the microphone array signals) to render the sound near and far robustly. The apparatus can be a single device performing both capturing and rendering, but may also be a system of apparatus wherein there is a first apparatus configured to perform capturing and another apparatus configured to perform rendering. In some embodiments the apparatus may be a portable device, for example a mobile phone. However in some embodiments the apparatus may be a substantially fixed or located electronic device. Thus, for example, the apparatus may be implemented as or part of a TV unit, a desktop computer or similar. The capture device may be a TV (having a microphone array attached to it). A desktop computer may furthermore although not physically containing a microphone array may be associated with a camera (for example a web-cam) or a telco device with an associated microphone array.

The embodiments described herein attempt to improve on the methods where the distance is rendered using the balance between the direct and the ambient sound, and therefore attempt to render the sound sources at the correct distance even when the sound sources are near. The embodiments attempt to reduce or eliminate any effect where a near sound source is perceived as being further away than it should be. This is because as indicated above HRTFs are defined in parametric rendering systems for far field sound sources in order to provide appropriate rendering of non-near sounds.

The advantages of the embodiments described herein may be a more immersive rendered audio. For example when a talker whispers near the microphone array, the sound source is rendered to be near the listener rather than being rendered far away from the listener.

Figure 2A:
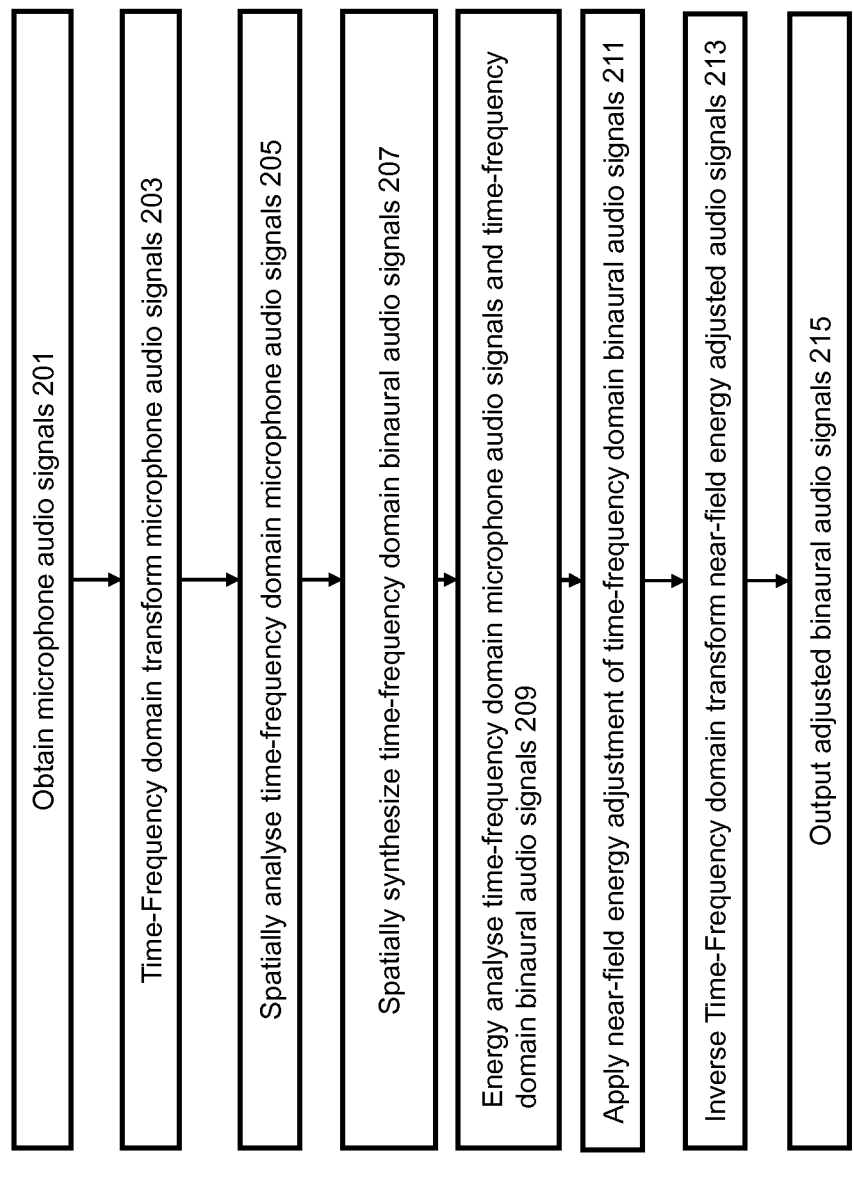
FIG. 2a shows a flow diagram of the operations of the apparatus shown in FIG. 1 according to some embodiments.

With respect to FIG. 1 is shown a suitable system of apparatus for implementing some embodiments. Furthermore FIG. 2a shows an example operation of the apparatus shown in FIG. 1.

The system in some embodiments comprises a suitable input configured to receive microphone array audio signals 100. In some embodiments the system furthermore comprises the microphone array. The operation of obtaining the microphone audio signals is shown in FIG. 2a by step 201.

Figure 3:
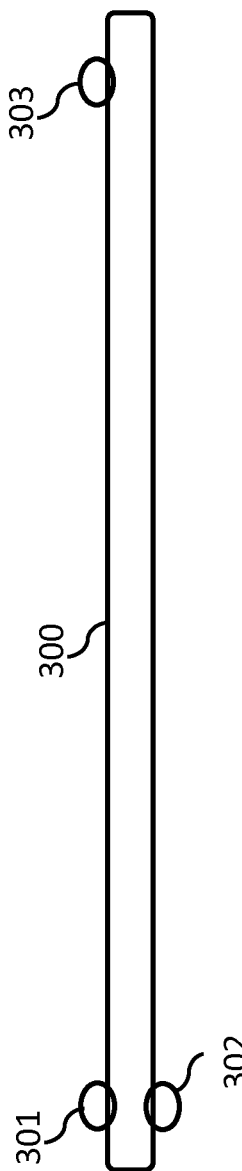
FIG. 3 shows schematically a microphone array positioning suitable for obtaining audio signals suitable for input to the system of apparatus shown in FIG. 1 according to some embodiments.

The microphone array suitable for generating the microphone array signals 100 may comprise two or more microphones mounted at known locations or positions about an apparatus such as a mobile phone capturing video at a landscape mode. An example of such an arrangement is shown in FIG. 3. In FIG. 3 there is shown the mobile phone 300 on which there are shown two microphones 301, 302 located near the left edge of the phone and one microphone 303 located near the right edge of the phone. Although a three microphone array arrangement is shown in FIG. 3 and described herein it would be understood that in some embodiments any suitable microphone array configuration located on any suitable apparatus can be used without requiring further inventive input.

The microphone array signals 100 can be provided to a Time-Frequency Transformer (Forward Filter Bank) 101. The Time-Frequency Transformer (Forward Filter Bank) 101 is configured to apply a time-frequency transform for the two or more microphone signals, for example a short-time Fourier transform (STFT) or a complex-modulated quadrature mirror filter (QMF) bank. The output of the Time-Frequency Transformer (Forward Filter Bank) 101 are Time-frequency audio signals 102. The Time-frequency audio signals 102 can in some embodiments be provided to a spatial analyser 103, a spatial/binaural synthesiser 105 and an energy analyser 107.

The operation of Time-Frequency domain transforming the obtained microphone audio signals is shown in FIG. 2a by step 203.

The spatial analyser 103 in some embodiments is configured to receive the Time-frequency audio signals 102 and determine spatial metadata in frequency bands.

The spatial metadata 104 in some embodiments comprises at least one direction parameter (in frequency bands) determining where the sound primarily (or prominently or in average) arrives from. The spatial metadata 104 further may comprise a ratio parameter in frequency bands indicating how directional or non-directional the sound is (in other words the directionality of the two or more audio signals) at that frequency band, for example a direct-to-total energy ratio. As the example shown in FIG. 3 is a mobile phone performing spatial audio capture, the spatial analyser 104 in this example may be configured in some embodiments to employ an analysis method such as described in EP3542546 to determine the spatial metadata. The method may be summarized by the following operations.

Firstly, in frequency bands, an azimuth value between −90 and 90 degrees is determined from the delay value that produces the maximum correlation between the microphone pair 301-303 (of FIG. 3). For example, a sound arriving from the side provides the maximum correlation at a different inter-microphone delay than a sound arriving from front or from back (i.e., more centre).

Then a front-back binary decision is determined as it is not yet known if the sound arrives from rear or front directions. For example, a sound at 40 degrees left may provide a similar inter-microphone delay than a sound at 140 degrees left. Therefore, correlation analysis at different delays is also performed on microphone pair 301-302. The distance between microphones 301 and 302 is small and the delay analysis is fairly noisy, and therefore only a binary front-back value is determined from that microphone pair. When a "back" value is observed, the azimuth parameter is mirrored to the rear side. For example, an azimuth of 80 degrees is mirrored to azimuth of 100 degrees. By these means a direction parameter is determined for each frequency band.

Furthermore, a direct-to-total energy ratio may be determined in frequency bands based on the normalized (between 0 and 1) cross-correlation value between microphone pair 301-303.

The directions and ratios may then be provided as spatial metadata 104 to the spatial/binaural synthesiser 105.

The aforementioned method is particularly suitable for flat devices, for example, mobile phones in a landscape video capturing orientation, where one axis is suitable only for front-back analysis. The method however is suboptimal for non-flat devices such as VR cameras due to uneven performance at certain directions. VR cameras could use for example Directional Audio Coding (DirAC), but DirAC and similar methods function only below the spatial aliasing frequency. Other methods such as US20130230187A1 could be implemented above the spatial aliasing frequency but requires prominent acoustic shadowing. In WO2019185988 a delay-search method for non-flat devices without substantial acoustic shadowing at some axes was provided. The method forms delays between the signals of several microphone pairs and uses vector algebra to determine the direction parameter. In other embodiments the determination of spatial parameters may be any suitable method. For example in some embodiments the method known as Directional Audio Coding (DirAC), that operates on the first order Ambisonics (FOA) signal, or any of its variants can be employed. The method determines, based on the FOA signal, in frequency bands, sound field intensity and energy parameters, which are used to obtain a direction and a (diffuse-to-total) energy ratio parameter. Other methods to obtain spatial parameters which may be employed in some embodiments are high angular resolution planewave expansion (Harpex) and its variants which estimate two simultaneous directions-of-arrival from the FOA signal. Another example is the Higher-order DirAC (HO-DirAC), that estimates more than one direction of arrival in sectors from the second or higher order Ambisonic signals. Such Ambisonic signals require more microphones from the device, for example, ideally at least 9 microphones for second order.

In summary there are many methods which may be employed to obtain spatial metadata 104 (e.g., directions, direct-to-total energy ratios) based on microphone array signals.

The operation of spatially analysing the time-frequency domain microphone audio signals to obtain the spatial parameters is shown in FIG. 2a by step 205.

In some embodiments the spatial synthesiser 105 is configured to receive the time-frequency audio signals 102 (from the Time-Frequency Transformer 101) and the spatial metadata (from the spatial analyser 103) and generate any suitable time-frequency domain spatial audio signal. In this example the spatial synthesiser 105 is configured to generate time-frequency domain binaural audio signals but in some embodiments the time-frequency domain spatial audio signals are time-frequency domain multichannel audio signals or stereo audio signals. The spatial synthesis implemented by the spatial synthesiser 105 can be any suitable synthesis method. For example the spatial synthesiser 105 may be configured to implement the following.

Firstly the time-frequency audio signals are divided, on a frequency band by band basis (or by groups of frequency bands) into direct and ambient signals based on the direct-to-total energy ratios from the spatial metadata 104. For example, if r(k,n) denotes a direct-to-total energy ratio at frequency band k and temporal frame index n, then a direct portion signal at the corresponding time-frequency region can be obtained by multiplying the time-frequency audio signals 102 (at that frequency band) by a factor $\sqrt{r(k,n)}$. Correspondingly, a multiplier for the ambient part is $\sqrt{1-r(k,n)}$.

Secondly a direct part is at each band processed with HRTFs corresponding to the direction parameter in the spatial metadata.

Thirdly an ambient part is processed with decorrelators to obtain a suitable incoherence. More specifically, in some embodiments, the decorrelators are designed such that the binaural output obtains the inter-channel correlation approximating the binaural diffuse field correlation.

Fourthly the direct and ambient parts are combined to generate time-frequency domain binaural audio signals 106.

These time-frequency domain binaural audio signals 106 can then be passed to the energy analyser 107 and the near-field energy adjuster 109.

Although this example of spatial/binaural synthesis is described other approaches for spatial synthesis may be implemented. For example a computationally more complex but potentially higher quality rendering may be to employ a least-squares optimized mixing to generate the spatial output based on the input signals and the spatial metadata. This for example is described in further detail for binaural rendering in WO2019086757. The benefit of implementing such an approach is that it reduces the need to use decorrelation, and thus improves the audio quality for signals such as applause and speech which are known to be difficult audio signal types for decorrelation.

The time-frequency domain binaural audio signals 106 may be denoted as $\check{S}_i(b,n)$, where b is the frequency bin index. A frequency bin corresponds to one frequency output of the Time-Frequency Transformer (Forward Filter Bank). A frequency band where the spatial metadata is determined may include one or multiple frequency bins.

The operation of spatially synthesizing the binaural time-frequency domain audio signals is shown in FIG. 2a by step 207.

The energy analyser 107 in some embodiments is configured to receive the time-frequency microphone audio signals 102 and the time-frequency binaural audio signals 106. The energy analyser 107 is further configured to determine or measure, for each time-frequency interval and for each channel, the energy of the time-frequency microphone audio signals 102 and the processed (synthesized) time-frequency binaural audio signals 106. In some embodiments the energy is determined by implementing a squaremagnitude-sum over the frequency bins (and potentially time indices) within the time-frequency intervals. For example, the energy of the time-frequency microphone audio signals 102 can be determined using $$E_i(k, n) = \sum_{b=b_{k,low}}^{b_{k,high}} |S_i(b, n)|^2$$

where E is the energy, i is the channel index, b is the frequency bin, $b_{k,low}$ is the lowest bin of the frequency band k, $b_{k,high}$ the highest bin, and $S_i(b,n)$ the time-frequency domain audio signal. In our example, there are three microphone signals denoted with indices A 301, B 303, C 302. The measured energies for the microphone signals are denoted $E_A(k,n)$, $E_B(k,n)$, and $E_C(k,n)$. The measured energies for the binaural signals (obtained based on $\hat{S}_i(b,n)$ correspondingly to the above formula) are denoted $E_{L,bin}(k,n)$ and $E_{R,bin}(k,n)$, for the left and right binaural audio channels, respectively.

The energy analyser 107 may in some embodiments further determine left and right microphone channel energies based on the microphone signal energies. The generation of the left and right microphone channel energies may depend on the microphone placement on the device.

For example, the energy analyser 107 may be configured to determine the left microphone channel energy as the energy of that microphone, which is the leftmost, and correspondingly to the right side. In this example, assuming the device in FIG. 3, this could mean for example:

$$E_{L,mic}(k,n)=E_A(k,n)$$

$$E_{R,mic}(k,n)=E_B(k,n)$$

In some embodiments the energy analyser 107 may be configured to determine selecting from the microphones two subgroups consisting of "left" and "right" edge microphones and formulating the energy values by an average operation. In the example device of FIG. 3 this may be configured as $$E_{L,mic}(k,n)=[E_A(k,n)+E_C(k,n)]/2$$

$$E_{R,mic}(k,n)=E_B(k,n)$$

These energy values $E_{L,bin}(k,n)$, $E_{R,bin}(k,n)$, $E_{L,mic}(k,n)$ and $E_{R,mic}(k,n)$ are provided as energy information 108 to the near-field energy adjuster 109.

The operation of generating energy information based on an energy analysis of the time-frequency domain microphone audio signals and time-frequency domain binaural audio signals is shown in FIG. 2a by step 209.

In some embodiments the near field energy adjuster 109 is configured to receive the binaural time-frequency audio signals 106 and the energy information 108, determine gain correction in frequency bands for the binaural time-frequency audio signals 106 and then apply the determined gain correction in frequency bands to the binaural time-frequency audio signals 106. The operation of applying near-field energy adjustment of binaural time-frequency domain audio signals is shown in FIG. 2a by step 211.

Figure 2B:
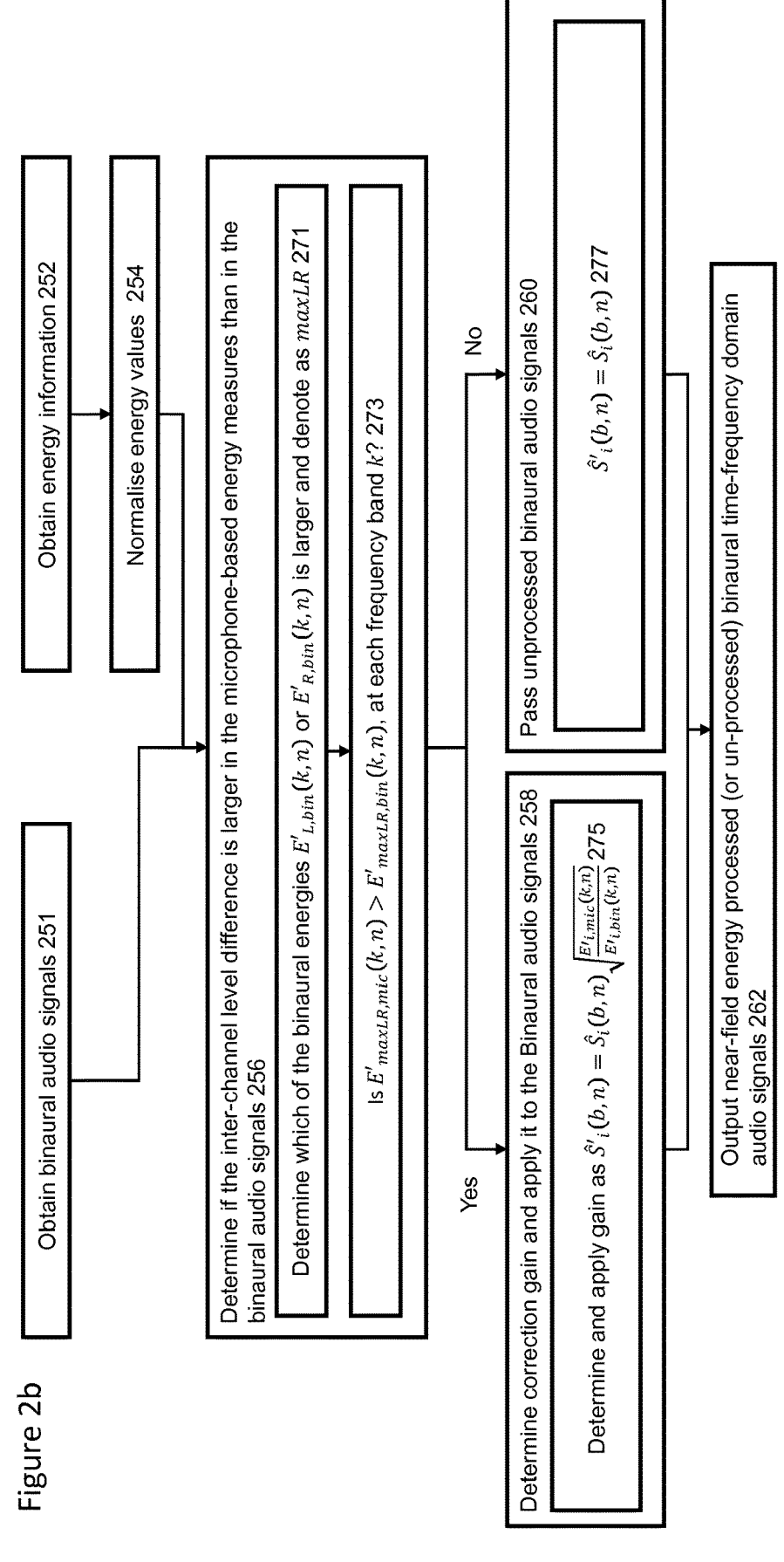
FIG. 2b shows a flow diagram of the near field energy adjustment operation as shown in FIG. 2a in further detail according to some embodiments.

The operation of applying near-field energy adjustment of time-frequency domain binaural audio signals is shown in further detail with respect to FIG. 2b.

A sound intensity function with respect to distance is $$I = \frac{W}{4\pi r^2}$$

where W is the power of the source and r is the distance. Hence, in a free field, the sound intensity level decreases by 6 dB each time the distance from the source is doubled. For example, if a sound source is 5 cm to the side from the nearest microphone and the distance between microphones is 15 cm, the level difference becomes 12 dB.

Such level-difference information may be utilized by the near field energy adjuster 109. In other words the near field energy adjuster 109 is configured to determine, based on the inter-microphone and binaural level differences, if the binaural output level differences need to be adjusted.

In some embodiments the determination of the gain correction is configured to providing the near-field features to the binaural signals when the sound sources are near to the microphone array.

With respect to the operation of the near field energy adjuster 109 the binaural audio signals can be obtained as shown in FIG. 2b by step 251. Furthermore the energy information can be obtained as shown in FIG. 2b by step 252.

In some embodiments the near field energy adjuster 109 is configured to normalize the energy values as $$E'_{L,bin}(k, n) = \frac{E_{L,bin}(k, n)}{E_{L,bin}(k, n) + E_{R,bin}(k, n)}$$

$$E'_{R,bin}(k, n) = \frac{E_{R,bin}(k, n)}{E_{L,bin}(k, n) + E_{R,bin}(k, n)}$$

$$E'_{L,mic}(k, n) = \frac{E_{L,mic}(k, n)}{E_{L,mic}(k, n) + E_{R,mic}(k, n)}$$

$$E'_{R,mic}(k, n) = \frac{E_{R,mic}(k, n)}{E_{L,mic}(k, n) + E_{R,mic}(k, n)}$$

The normalisation of the energy values is shown in FIG. 2b by step 254.

Then, the near field energy adjuster 109 may be configured to determine if the inter-channel level difference is larger in the time-frequency audio signal (microphone-based) energy determination than in the time-frequency binaural audio signal energy determination. The determination of if the inter-channel level difference is larger in the time-frequency audio signal (microphone-based) energy determination than in the time-frequency binaural audio signal energy determination is shown in FIG. 2b by step 256. This may then be used to determine if level processing is needed to obtain an improved near-field binaural capture performance.

The concept implemented in these embodiments is that when the sound source is close to a microphone (and to one side of the device/apparatus), it generates a left-right level difference between the microphones (or microphone groups). The resulting binaural level difference should not be lesser. For example the near field energy adjuster 109 may implement the following steps.

Firstly, the near field energy adjuster 109 may be configured to determine which of the binaural energies $E'_{L,bin}(k,n)$ or $E'_{R,bin}(k,n)$ is larger. The channel index that has higher energy (either L or R index) may then be denoted maxLR. The determination of which of the binaural energies $E'_{L,bin}(k,n)$ or $E'_{R,bin}(k,n)$ is larger and denoting the largest as maxLR is shown in FIG. 2b by (sub)step 271.

Then it is checked if $E'_{maxLR,mic}(k,n) > E'_{maxLR,bin}(k,n)$, at each frequency band k. The check is shown in FIG. 2b by (sub)step 273.

Where the inter-channel level is not larger in the microphone-based energy measures than in the binaural audio signals then the near-field energy adjuster 109 is configured to output for that frequency band the input binaural audio signal unprocessed as shown in FIG. 2b by step 260. In other words, as shown in FIG. 2b by (sub)step 277, $$\hat{S}'_i(b,n) = \hat{S}_i(b,n),$$

for those bins b that are included to the frequency band being processed.

Where the inter-channel level is larger in the microphone-based energy measures than in the binaural audio signals then the near-field adjuster 109 is configured to determine a correction gain and apply the correction gain to the time-domain binaural audio signals as shown in FIG. 2b by step 258. This in further detail may be shown in the (sub)step 275 where the levels are processed by $$\hat{S}'_i(b,n) = \hat{S}_i(b,n)\sqrt{\frac{E'_{i,mic}(k,n)}{E'_{i,bin}(k,n)}},$$

for both channels i=L, R, for all bins b within the band k.

Then, the near field energy adjuster 109 is configured to output the energy-corrected binaural time-frequency signals $\hat{S}'_i(b,n)$ 110 (which as shown above may be unprocessed audio signals) to an inverse time-frequency domain transformer (inverse filter bank) 111. This is shown in FIG. 2b by step 262.

The aforementioned formulas assume a typical device size (e.g. 10-20 cm microphone spacing), where the inter-channel level differences of the microphones provide for practical purposes reasonable approximation of the desired inter-aural level differences at the near field. For other device sizes, e.g. with 5 cm microphone spacing the formulas are updated, for example, by exaggerating the measured inter-microphone level differences prior to the above formulas.

The inverse time-frequency transformer (inverse filter bank) 111 is configured to obtain the corrected (where needed) time-frequency domain binaural audio signals and apply the inverse time-frequency transform corresponding to the time-frequency transform applied at the time-frequency transformer 101. The application of the inverse Time-Frequency domain transform to the near-field energy adjusted audio signals is shown in FIG. 2a by 213.

The output of the inverse time-frequency transformer is a binaural output audio signal 112 suitable for listening. The output of the binaural output audio signal 112 suitable for listening is shown in FIG. 2a by step 215. The binaural output audio signal is such that it has otherwise the spatial features according to legacy parametric binaural audio capture and rendering methods, but it adds the feature of accounting for sound sources that are nearby, providing an improved effect of the sound source being near to the ears of the listener.

In the foregoing, the determination of whether the microphone-based inter-channel level difference is larger than the binaural inter-aural level difference did not require computing the actual level differences. Instead, these differences were computed indirectly using values related to the inter-channel and inter-aural level differences. The normalized energy values $E'_{L,mic}$ and $E'_{R,mic}$ are related to the microphone-based inter-channel level difference and $E'_{L,bin}$ and $E'_{R,bin}$ to the binaural inter-aural level difference. As the values are normalized, if the left and the right channels have the same level, the values of 0.5 are obtained (for both). Correspondingly, if one channel is clearly louder than the other, it gets a value close to 1, whereas the softer channel gets a value close to 0. Hence, these values are related to the inter-channel and inter-aural level differences and can thus be used for determining which of the level differences is larger.

In some embodiments, the actual level differences can be computed for determining whether the microphone-based inter-channel level difference is larger than the binaural inter-aural level difference. In this case, the smaller energy is subtracted from the larger energy, and the differences are inspected to determine which difference is larger. E.g., if the left energies are larger, then it may be checked whether $E'_{L,mic}(k,n) - E'_{R,mic}(k,n) > E'_{L,bin}(k,n) - E'_{R,bin}(k,n)$. This corresponds to step 273 of FIG. 2b. As the energy values are normalized, the following equations hold $E'_{L,mic}(k,n) + E'_{R,mic}(k,n) = 1$ and $E'_{L,bin}(k,n) + E'_{R,bin}(k,n) = 1$. By substituting the values for $E'_{R,mic}(k,n)$ and $E'_{R,bin}(k,n)$, the above equation can be presented as $2E'_{L,mic}(k,n) - 1 > 2E'_{L,bin}(k,n) - 1$. Hence, it can be seen that this equation actually produces same results as the presented earlier (i.e., $E'_{maxLR,mic}(k,n) > E'_{maxLR,bin}(k,n)$).

In some other embodiments, other equations may be used for the determination if the microphone-based inter-channel level difference is larger than the binaural inter-aural level difference.

The system as described in the foregoing involves processing of microphone signals to an audible output. However for clarity other procedures to improve the audio signal quality, such as automatic gain control, microphone noise suppression, wind noise suppression, environmental noise suppression, and audio focusing (e.g., along with video zoom) have not been discussed but may be implemented in some embodiments (especially when considering mobile phones and the audio signals generated therefrom).

The embodiments therefore relate to parametric binaural spatial audio reproduction of microphone-array captured audio, which enables the reproduction of a sound source, that is near a microphone array in a captured sound scene, at a distance near the listener (and far-away sources far-away). Furthermore the embodiments may comprise apparatus comprising means configured to analyse the microphone-array signals in order to obtain spatial metadata (at least directions in frequency bands), analyse microphone-array signals in order to obtain inter-channel level differences, determine target inter-aural level differences using the determined spatial metadata and the determined inter-channel level differences, and render binaural audio using the microphone signals, the determined spatial metadata, and the determined target inter-aural level differences.

In some embodiments metadata-based inter-aural level differences (ILD) are first determined in frequency bands using the spatial metadata and a head-related transfer function (HRTF) set (e.g., select an HRTF pair corresponding to the direction in the spatial metadata and determine the ILD at that frequency band). Then, inter-channel level differences are determined in frequency bands using at least two microphones in the array (e.g., microphones at the ends of the device). Then, the target inter-aural level differences are determined by taking the maximum of the metadata-based inter-aural level differences and the inter-channel level differences. Then, the parametric spatial rendering is performed as in the prior art, but when the target ILDs are larger than the metadata-based ILDs, the rendering is modified so that the resulting binaural signals contain the target ILDs.

These embodiments may therefore be configured to render near sources such that they are perceived to be near (since ILDs are increased when the source is near and on the side), and far-away sources are rendered such that they are perceived to be far. This produces a more immersive spatial sound perception as the distance is rendered correctly also when the source is near.

The method can produce this distance effect reliably as it does not require estimating the distance parameter. Moreover, it does not require having near-field HRTFs stored (thus requiring less memory and can be used with more commonly available regular HRTFs). Instead, the perception of near sound sources can be produced by analysing the level differences between the microphones and tuning the rendering based on it. This can be done reliably with a variety of devices.

Nevertheless, in some embodiments, the distance of the sound source can be first estimated in frequency bands using the microphone signals (e.g., using the level-difference between the microphone signals) and/or spatial metadata, and the target inter-aural level difference can be determined using the spatial metadata (e.g., direction), the estimated distance, and a HRTF data set containing also near-field HRTFs at different distances.

The example embodiments presented above utilize normalized channel energy values (of binaural audio signals and microphone audio signals) to adjust the inter-aural level differences to obtain the near-field reproduction when needed. It should, however, be noted that, as a generalization, in some embodiments, energies or amplitudes or normalized amplitudes for each channel, or level-difference values (e.g. left-to-right energy balance values) are computed, and these values are compared. Such measures may be used to produce the same effect as computing the processing based on the normalized channel energy values, but it may be more suitable in some implementations.

In the above example embodiments, all the processing is performed in a single device directly using the microphone signals. In some embodiments, some parts of the processing are performed in a capture device, and some parts in a playback device. In some cases, these two can be the same device, and there may be storage in between. In some embodiments, the capture device and playback device may be two different devices and there may be transmission of information and signals in between.

Figure 4:
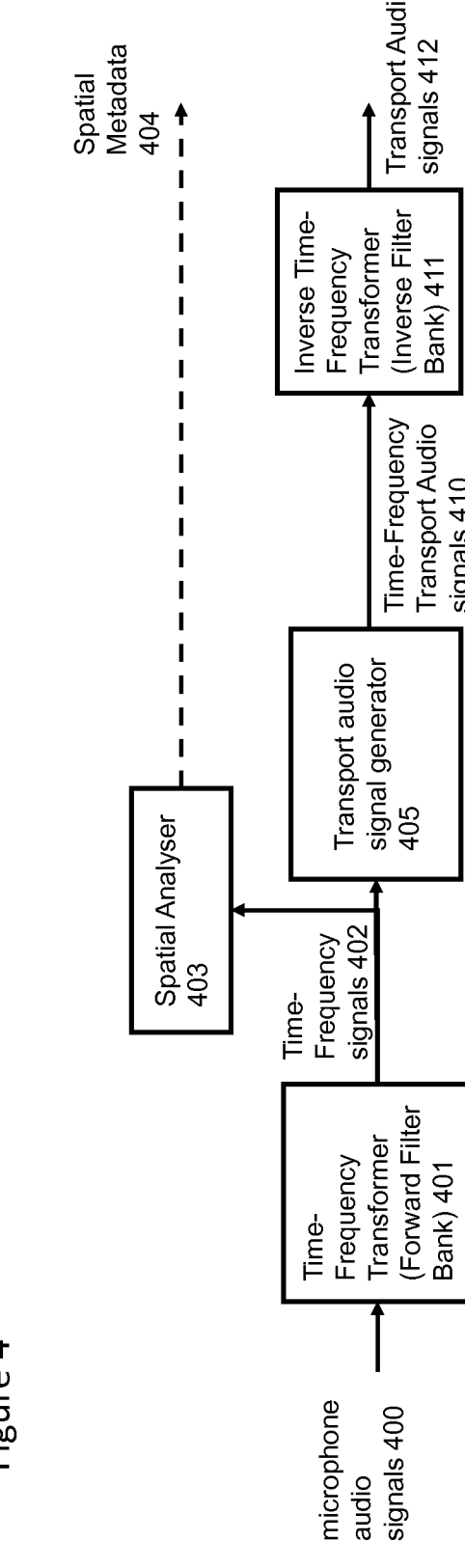
FIG. 4 shows schematically a separate capture system of apparatus suitable for implementing some embodiments.
Figure 6:
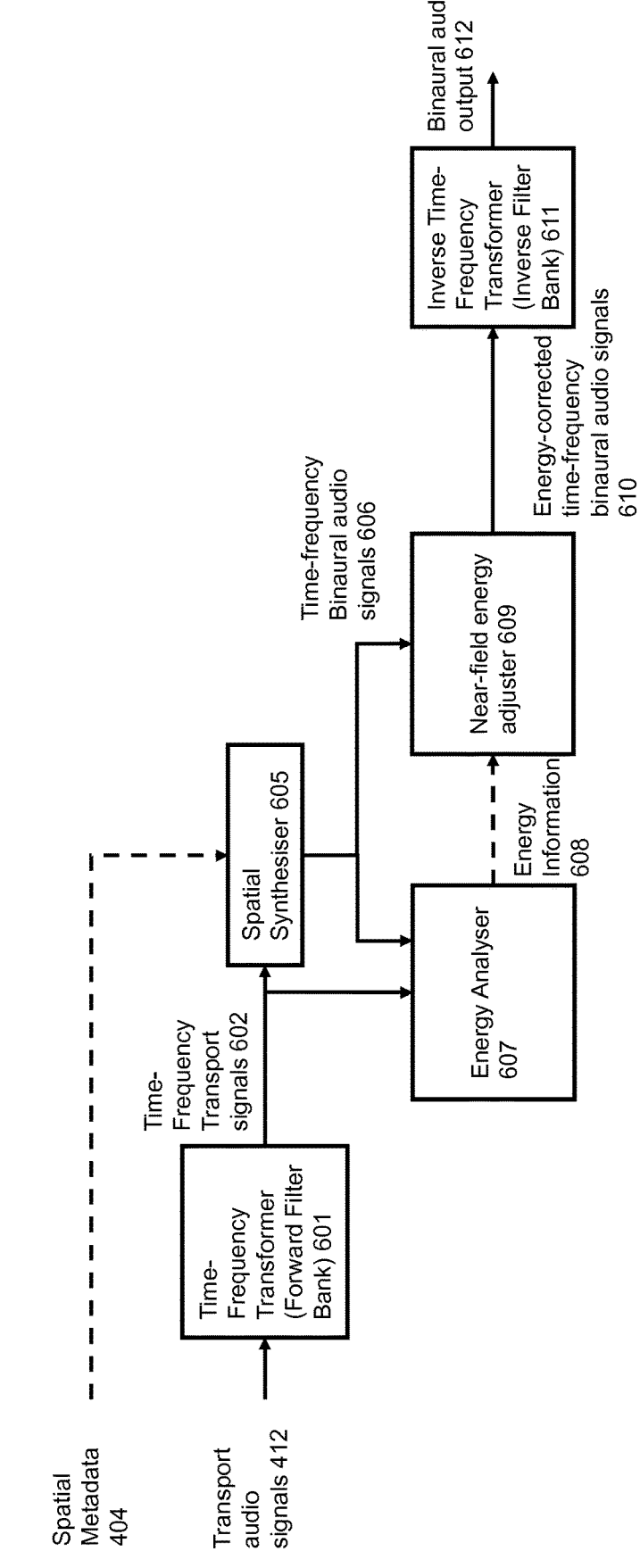
FIG. 6 shows schematically a separate processing system of apparatus suitable for implementing some embodiments.

For example with respect to FIGS. 4 and 6 and associated flow diagrams 5 and 7 there are shown capture and playback apparatus respectively (and associated flow diagrams showing operations of the capture and playback apparatus).

Figure 5:
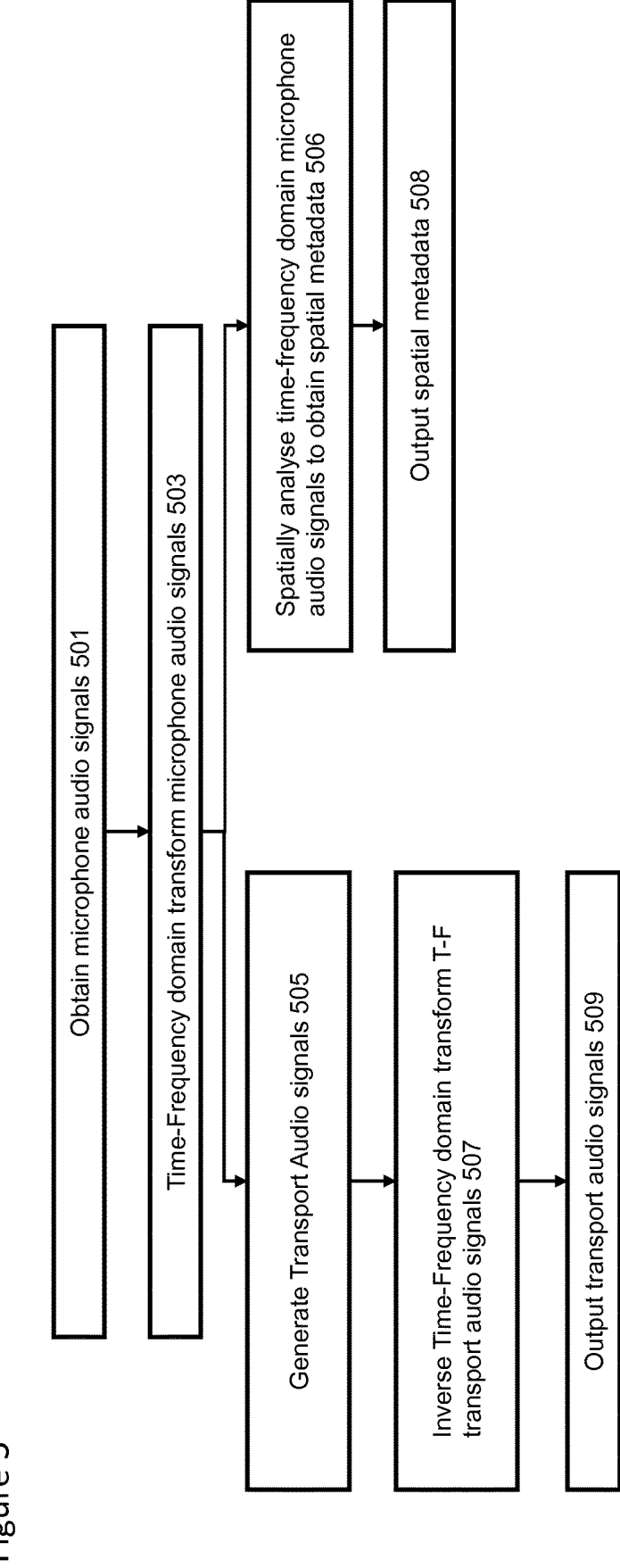
FIG. 5 shows a flow diagram of the operations of the apparatus shown in FIG. 4 according to some embodiments.

For example FIG. 4 shows an example capture (only) apparatus and FIG. 5 the operations of the example capture apparatus according to some embodiments. The system in some embodiments comprises a suitable input configured to receive microphone array audio signals 400. In some embodiments the system furthermore comprises the microphone array. The operation of obtaining the microphone audio signals is shown in FIG. 5 by step 501.

The microphone array may have an arrangement such as shown in FIG. 3, in other words the capture apparatus may be a mobile phone.

The microphone array signals 400 can be provided to a Time-Frequency Transformer (Forward Filter Bank) 401. The Time-Frequency Transformer (Forward Filter Bank) 401 is configured to apply a time-frequency transform for the two or more microphone signals, for example a short-time Fourier transform (STFT) or a complex-modulated quadrature mirror filter (QMF) bank. The output of the Time-Frequency Transformer (Forward Filter Bank) 401 are Time-frequency audio signals 402. The Time-frequency audio signals 402 can in some embodiments be provided to a spatial analyser 403 and transport audio signal generator 405.

The operation of Time-Frequency domain transforming the obtained microphone audio signals is shown in FIG. 5 by step 503.

The spatial analyser 403 in some embodiments is configured to receive the Time-frequency audio signals 402 and determine spatial metadata in frequency bands. The spatial analyser 403 may in some embodiments obtain the spatial metadata in a manner similar to that described above with respect to the spatial analyser 103.

The directions and ratios may then be provided as spatial metadata 404 to be stored or transmitted.

The operation of spatially analysing the time-frequency domain microphone audio signals to obtain the spatial parameters (the spatial metadata) is shown in FIG. 5 by step 506.

The operation of outputting (for storage or transmission) the spatial metadata is shown in FIG. 5 by step 508.

The transport audio signal generator 405 is configured to generate the audio signals for transmission or storage (e.g., select microphone signals A and B, and apply appropriate equalization and other processing such as noise reduction and gain control). The time-frequency transport audio signals 410 can then be output to an inverse time-frequency transformer (Inverse Filter Bank) 411. The generating of the transport audio signals is shown in FIG. 5 by step 505.

The inverse time-frequency transformer (Inverse Filter Bank) 411 can in some embodiments be configured to convert the time-frequency transport audio signals 410 to the time domain. In some embodiments the transport audio signals are generated in the time domain.

The inverse transforming of the time-frequency transport audio signals 410 is shown in FIG. 5 by step 507.

The generated transport audio signals 412 and the spatial metadata 404 can in some embodiments be stored (in a suitable data storage means) or transmitted (to another apparatus/device). In some embodiments the audio signals and metadata may further be encoded with suitable encoding and/or multiplexed (e.g., using the forthcoming 3GPP IVAS codec).

The outputting of the transport audio signals is shown in FIG. 5 by step 509.

With respect to FIG. 6 shows an example playback (only) apparatus and FIG. 7 the operations of the example playback apparatus according to some embodiments. In some embodiments the playback device is configured to receive or retrieve the transport audio signals 412 and the spatial metadata 404 (and perform suitable decoding and/or demultiplexing). The operation of obtaining the transport audio signals 412 is shown in FIG. 7 by step 701 and obtaining the spatial metadata 404 is shown in FIG. 7 by step 702.

The transport audio signals 412 can be provided to a Time-Frequency Transformer (Forward Filter Bank) 601. The Time-Frequency Transformer (Forward Filter Bank) 601 is configured to apply a time-frequency transform for the transport audio signals, for example a short-time Fourier transform (STFT) or a complex-modulated quadrature mirror filter (QMF) bank. The output of the Time-Frequency Transformer (Forward Filter Bank) 601 are Time-frequency transport audio signals 602. The Time-frequency transport audio signals 602 can in some embodiments be provided to a spatial synthesiser 605 and an energy analyser 607.

The operation of Time-Frequency domain transforming the obtained transport audio signals is shown in FIG. 7 by step 703.

In some embodiments the spatial synthesiser 605 is configured to receive the time-frequency transport audio signals 602 (from the Time-Frequency Transformer 601) and the spatial metadata 404. The spatial synthesis can be any suitable synthesis method such as the spatial synthesiser 105 described above.

The operation of spatially synthesizing the time-frequency domain binaural audio signals is shown in FIG. 7 by step 705.

The energy analyser 607 in some embodiments is configured to receive the time-frequency transport audio signals 602 and the time-frequency binaural audio signals 606. The energy analyser 607 is further configured to determine or measure, for each time-frequency interval and for each channel, the energy of the time-frequency transport audio signals 602 and of the processed (synthesized) time-frequency binaural audio signals 606 in a manner described earlier with respect to the energy analyser 107.

The operation of generating energy information based on an energy analysis of the time-frequency domain transport audio signals and binaural audio signals is shown in FIG. 7 by step 709.

In some embodiments the near field energy adjuster 609 is configured to receive the binaural time-frequency audio signals 606 and the energy information 608, determine gain correction in frequency bands for the binaural time-frequency audio signals 606 and then apply the determined gain correction in frequency bands to the binaural time-frequency audio signals 606. The processed (or passed unprocessed) energy-corrected binaural time-frequency audio signals 610 can be passed to an inverse time-frequency transformer (Inverse Filter Bank) 611.

The operation of applying near-field energy adjustment of time-frequency domain binaural audio signals is shown in FIG. 7 by step 711.

The operation of applying near-field energy adjustment of time-frequency domain binaural audio signals may be that as described above.

The inverse time-frequency transformer (inverse filter bank) 611 is configured to obtain the corrected where needed time-frequency binaural audio signals and apply the inverse time-frequency transform corresponding to the time-frequency transform applied at the time-frequency transformer 601. The application of the inverse Time-Frequency domain transform to the near-field energy adjusted audio signals is shown in FIG. 7 by step 713.

The output of the inverse time-frequency transformer is a binaural output audio signal 612 suitable for listening. The output of the binaural output audio signal 612 suitable for listening is shown in FIG. 7 by step 715.

The playback apparatus may for example be similar to that as shown in FIG. 1, but the spatial analysis is not needed as the spatial metadata is retrieved (it was performed in the capture apparatus), and the transport audio signals are used instead microphone array signals.

It should be noted that, in such embodiments at least two transport audio signals are required, and they should have suitable features for determining the energy information (e.g., they are based on microphones having horizontal spacing in between them in order to have level differences in case of near-by sources).

In some embodiments, for example where these requirements cannot be achieved, then the following apparatus can be employed instead. For example with respect to FIGS. 8 and 10 and associated flow diagrams 9 and 11 there are shown capture and playback apparatus respectively (and associated flow diagrams showing operations of the capture and playback apparatus).

Figure 8:
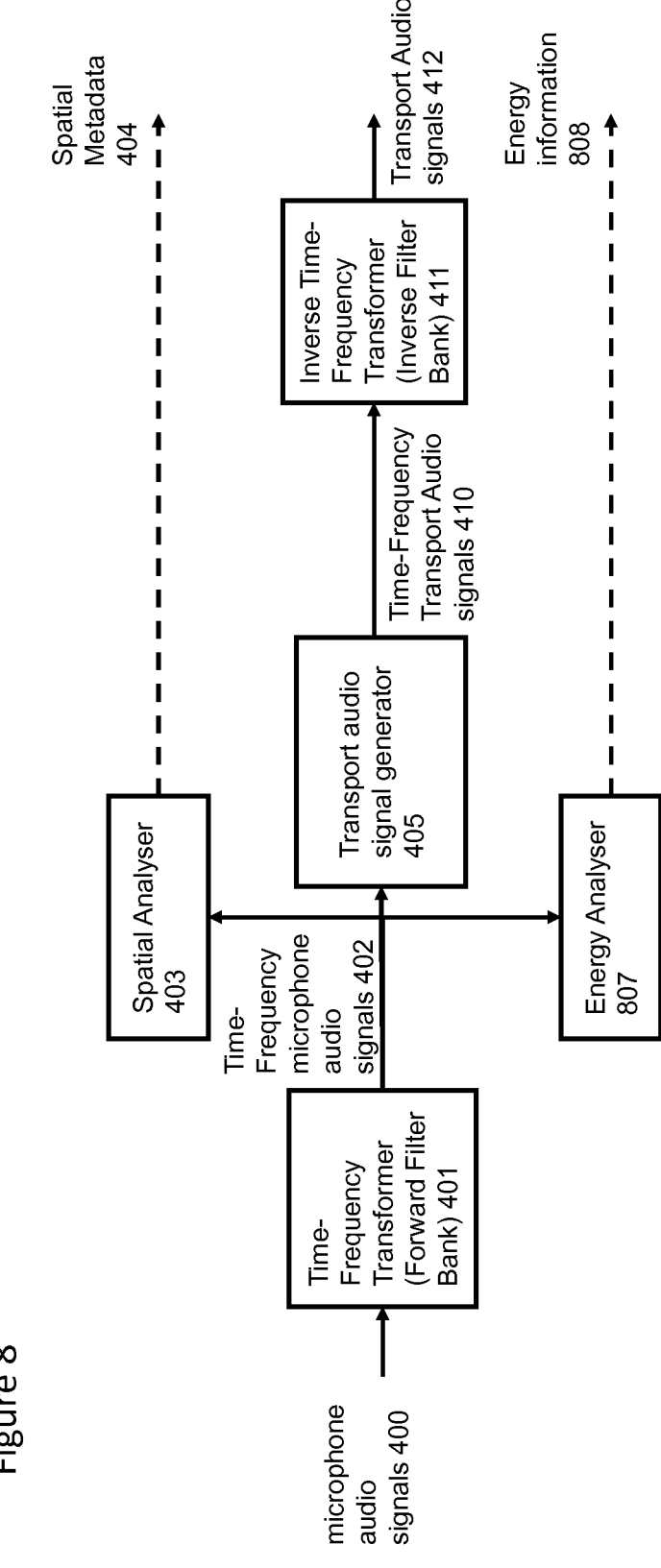
FIG. 8 shows schematically a separate capture system of apparatus with energy analysis suitable for implementing some embodiments.
Figure 9:
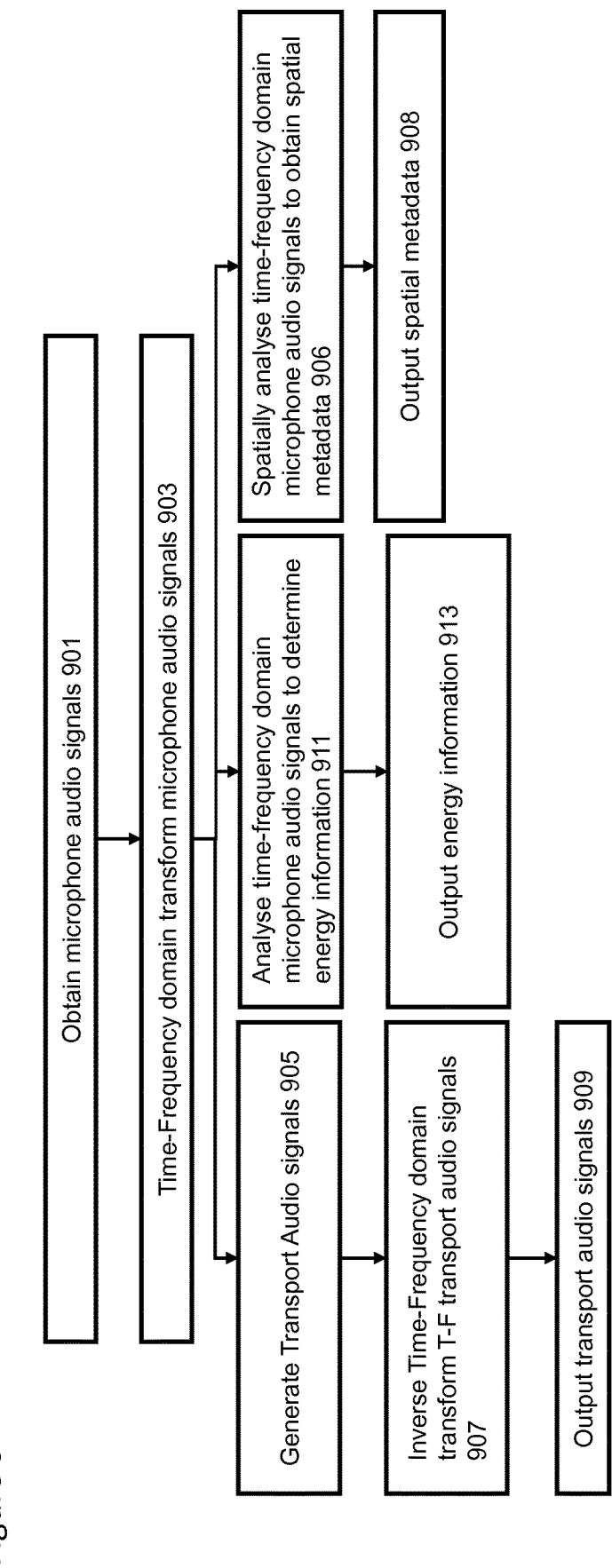
FIG. 9 shows a flow diagram of the operations of the apparatus shown in FIG. 8 according to some embodiments.

For example FIG. 8 shows an example capture (only) apparatus similar to that shown in FIG. 4, and FIG. 9 the operations of the example capture apparatus according to some embodiments. The example capture (only) apparatus shown in FIG. 8 differs from that as shown in FIG. 4 in that there is furthermore an energy analyser 807 configured to receive the time-frequency microphone audio signals 402 and configured to perform an energy analysis in a manner similar as shown in FIG. 1 and configured to produce energy information which can be passed to the playback device.

The operation of obtaining the microphone audio signals is shown in FIG. 9 by step 901.

The operation of Time-Frequency domain transforming the obtained microphone audio signals is shown in FIG. 9 by step 903.

The operation of spatially analysing the time-frequency domain microphone audio signals to obtain the spatial parameters is shown in FIG. 9 by step 906.

The operation of outputting (for storage or transmission) the spatial metadata is shown in FIG. 9 by step 908.

The generating of the time-frequency transport audio signals is shown in FIG. 9 by step 905.

The inverse transforming of the time-frequency transport audio signals 410 is shown in FIG. 9 by step 907.

The outputting of the transport audio signals is shown in FIG. 9 by step 909.

The analysis of the time-frequency domain microphone audio signals to determine energy information is shown in FIG. 9 by step 911.

The outputting of energy information is shown in FIG. 9 by step 913.

Figure 10:
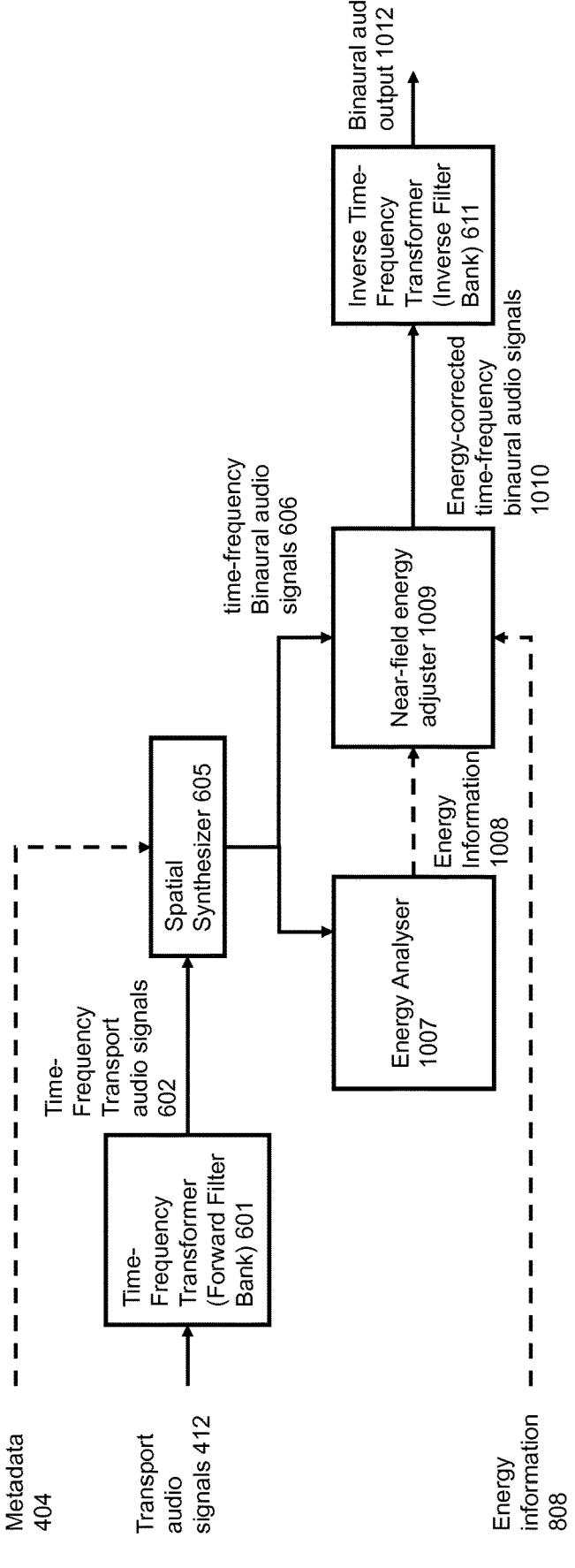
FIG. 10 shows schematically a separate processing system of apparatus with an energy information input suitable for implementing some embodiments.
Figure 11:
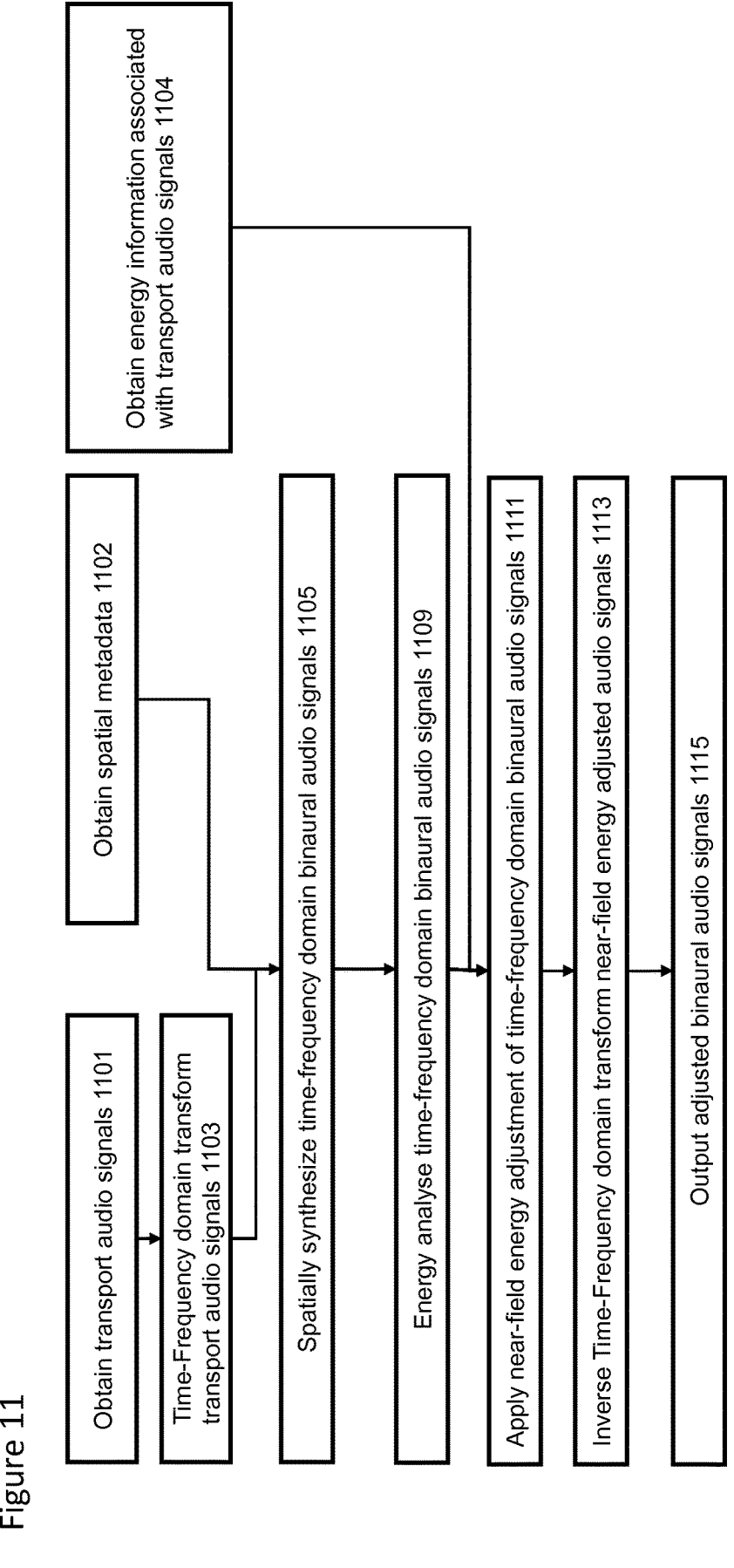
FIG. 11 shows a flow diagram of the operations of the apparatus shown in FIG. 10 according to some embodiments.

FIG. 10 shows an example playback (only) apparatus similar to that shown within FIG. 6, and FIG. 11 shows the operations of the example playback apparatus according to some embodiments where the energy information (associated with the transport audio signal) 808 is received from the capture device.

FIG. 10 therefore differs from the example shown in FIG. 6 in that the energy information (associated with the transport audio signal and which in turn is based on the energy analysis of the microphone audio signals) is received from the capture device whereas the apparatus comprises an energy analyser 1007 configured to receive the time-frequency binaural audio signals 606 and determine energy information associated with the binaural audio signals. The near-field energy adjuster 1009 is then configured to perform the methods shown above using the received energy information 808 (associated with the transport audio signal) from the capture device as well as the determined energy information 1008 (associated with the binaural audio signal) from the energy analyser 1007.

The operation of obtaining the transport audio signals 412 is shown in FIG. 11 by step 1101, obtaining the spatial metadata 404 is shown in FIG. 11 by step 1102 and obtaining the energy information (associated with the transport audio signal) 808 is shown in FIG. 11 by step 1104.

The operation of Time-Frequency domain transforming the obtained transport audio signals is shown in FIG. 11 by step 1103.

The operation of spatially synthesizing the binaural time-frequency domain audio signals is shown in FIG. 11 by step 1105.

The operation of generating energy information based on an energy analysis of the time-frequency domain binaural audio signals is shown in FIG. 11 by step 1109.

In some embodiments the near field energy adjuster 1009 is configured to receive the time-frequency binaural audio signals 606, the received energy information (associated with the time-frequency transport audio signal) 808 and the analysed energy information (associated with the time-frequency domain binaural audio signal) 1008 and based on these determine whether gain correction (to alter the level differences) in frequency bands for the time-frequency binaural audio signals 606 is required and generate suitable correction gains and then apply the determined gain correction in frequency bands to the time-frequency binaural audio signals 606. The processed (or passed unprocessed) energy-corrected time-frequency binaural audio signals 1010 can be passed to an inverse time-frequency transformer (Inverse Filter Bank) 611.

The operation of applying near-field energy adjustment of time-frequency domain binaural audio signals is shown in FIG. 11 by step 1111.

The operation of applying near-field energy adjustment of binaural time-frequency domain audio signals may be that as described above.

The inverse time-frequency transformer (inverse filter bank) 611 is configured to obtain the corrected where needed binaural audio signals and apply the inverse time-frequency transform corresponding to the time-frequency transform applied at the time-frequency transformer 601. The application of the inverse Time-Frequency domain transform to the near-field energy adjusted audio signals is shown in FIG. 11 by 1113.

The output of the inverse time-frequency transformer is a binaural output audio signal 1012 suitable for listening. The output of the binaural output audio signal 1012 suitable for listening is shown in FIG. 11 by step 1115.

In such embodiments there is an advantage in that there are no requirements for the transport audio signals (e.g., only one transport audio signal may be used).

Although the examples above describe a capturing audio signals with a mobile phone with microphones at the left and right sides in some embodiments the audio signals can be captured by other configurations of apparatus. For example a spherical VR camera having microphones mounted on its surface, or a non-flat/3D microphone array such as the Eigenmike can be employed to capture audio signals suitable for some embodiments. With such capture arrangements, the microphones are not only "left" and "right" but may be to any direction. This enables the near-field information (based on the microphone channel energies) to be obtained at multiple orientations, and therefore the near-field reproduction is achieved also for head-tracked binaural reproduction.

In some embodiments, when the microphone signal energies at frequency bands are known, the head orientation information is used to determine which microphone signals contribute to $E_{L,mic}(k,n)$ and $E_{R,mic}(k,n)$. From the head orientation, it is straightforward to determine the "left" and "right" directions, and for example the microphones nearest to these directions are selected to contribute to $E_{L,mic}(k,n)$ and $E_{R,mic}(k,n)$. In some embodiments the microphone energetic information at various directions may be encoded in a suitable way and provided to be used at a decoder enabling the near-field reproduction.

In some embodiments the above methods may be employed for multiple microphone arrays that are utilized for 6 degrees of freedom (6 DOF) playback as proposed in GB patent application number 2002710.8. In that patent application, the spatial metadata (directions, ratios) are estimated for each array, and the spatial metadata is then interpolated to positions in between the arrays to allow robust 6 DOF spatial audio reproduction. In some embodiments if the microphone arrays are all of same kind, it is possible to interpolate also the microphone signal energies, and use the above method to obtain $E_{L,mic}(k,n)$ and $E_{R,mic}(k,n)$ for rendering.

However in some embodiments where the microphone arrays are not of same kind, near-field information may be determined based on the inter-microphone energetic values (for each array) in the following manner:

Determining first direction being the estimated direction of arriving sound

Determining second direction being the opposite of the first direction

Determining microphone signal energetic values (similar to $E_{L,mic}(k,n)$ and $E_{R,mic}(k,n)$) corresponding to the first and second direction Mapping the energetic values as the near-field information. The near-field information could simply be the level-difference of the first and second energetic value At 6 DOF rendering, interpolating the near-field information values (to the listener position) in a manner that the other metadata values are interpolated in NC318930

At the rendering, using that nearness value to modify the ILD so that the more the sound is at side when compared to the user head orientation, the more the ILD values are processed according to the principles shown in the previous embodiments.

In some embodiments the methods described above may be employed in head-tracked binaural reproduction and position-tracked binaural reproduction. The use cases and encoding schemes may be according to the forthcoming MPEG-I standard.

In some embodiments, the target inter-aural level differences are determined by taking the maximum of the metadata-based inter-aural level differences and a product of a tuning factor and the inter-channel level differences between the microphone signals. This can be done, e.g., by modifying the equations for computing $E'_{L,mic}(k,n)$ or $E'_{R,mic}(k,n)$ to the form $$E'_{L,mic}(k,n) = \left( \frac{E_{L,mic}(k,n)}{E_{L,mic}(k,n) + E_{R,mic}(k,n)} - 0.5 \right)\beta + 0.5$$

$$E'_{R,mic}(k,n) = \left( \frac{E_{R,mic}(k,n)}{E_{L,mic}(k,n) + E_{R,mic}(k,n)} - 0.5 \right)\beta + 0.5$$

where $\beta$ is the device specific tuning factor. In practical implementations it is often reasonable to limit allowed range of $E'_{L,mic}(k,n)$ or $E'_{R,mic}(k,n)$ e.g. by using minimum allowed value E'min as follows:

$$\text{if}(E'_{i,mic}(k,n) < E'_{min}) \rightarrow E'_{i,mic}(k,n) = E'_{min}$$

$$\text{if}(E'_{i,mic}(k,n) > 1 - E'_{min}) \rightarrow E'_{i,mic}(k,n) = 1 - E'_{min}$$

where the value of $E'_{min}$ is between 0 and 0.5. This limitation keeps relative energy differences at realistic range.

The device specific tuning factor allows device-specific tuning so that the inter-channel level differences can be scaled depending on the device properties, such as physical shape and microphone locations. This may, especially, be useful when the inter-channel level differences between the microphone signals deviates significantly from the inter-aural level differences measured at the same distance. The value of β can be selected, e.g., such that for sounds coming from the near side directions level difference match with inter-aural level difference.

It should be noted that the above equation is merely one example, and the optimal equation for computing the energies $E'_{L,mic}$ and $E'_{R,mic}$ may be different. Moreover, the equation may be different for different devices. In any case, the aim is to obtain energy differences from the microphone energies that the energy differences correspond to inter-aural energy differences at that distance.

In some embodiments, the device specific maximum ILD between the microphone signals may be known. If the estimated ILD is larger than that, it can be expected that the ILD is caused be some signal corruption (such as wind or handling noise), and near-field processing can be bypassed.

In some embodiments, sound source direction analysis, which is part of spatial analysis, can be utilized to detect if the level differences between microphones are prominently caused, e.g., by wind noise or mic blocking, etc., thus avoiding synthesizing the near field effect for sounds which are not in the near field. For example, when sound is coming directly from side there typically is a range of level difference values which are possible for given device in normal recording conditions. Equally, if sound is coming from front left the range of possible level difference values is different. In both example situations, if the level difference value is out of typical range, near field synthesis should not be used.

In some embodiments, the distance of a sound source is estimated. The estimation should be such that it works in near distances on sides, as the perceptual effects are the largest there. The estimation can, e.g., be performed as follows. First, the normalized energies of the microphone channels $E'_{L,mic}(k,n)$ and $E'_{R,mic}(k,n)$ are estimated as presented above. Then, the difference between the normalized energies is computed $$E'_{L-R,mic}(k,n)=|E'_{L,mic}(k,n)-E'_{R,mic}(k,n)|$$

This energy difference is then compared to a database of (device-specific) level differences at different distances (based on direction and direct-to-total energy ratio in that time-frequency tile). The distance with the level difference providing the best match is selected as the estimated distance. Then, in the rendering phase, the HRTF is replaced by the near-field HRTF matching the estimated distance in that time-frequency band.

It should be noted such embodiments require reliable direction (and direct-to-total energy ratio) estimation in near-field range distances in order to provide good audio quality.

The term inter-aural level difference (ILD) typically refers to the level differences of audio between the ears of human listeners. It is used also to refer to inter-channel level differences of binaural audio signals or any binaural information.

Figure 12:
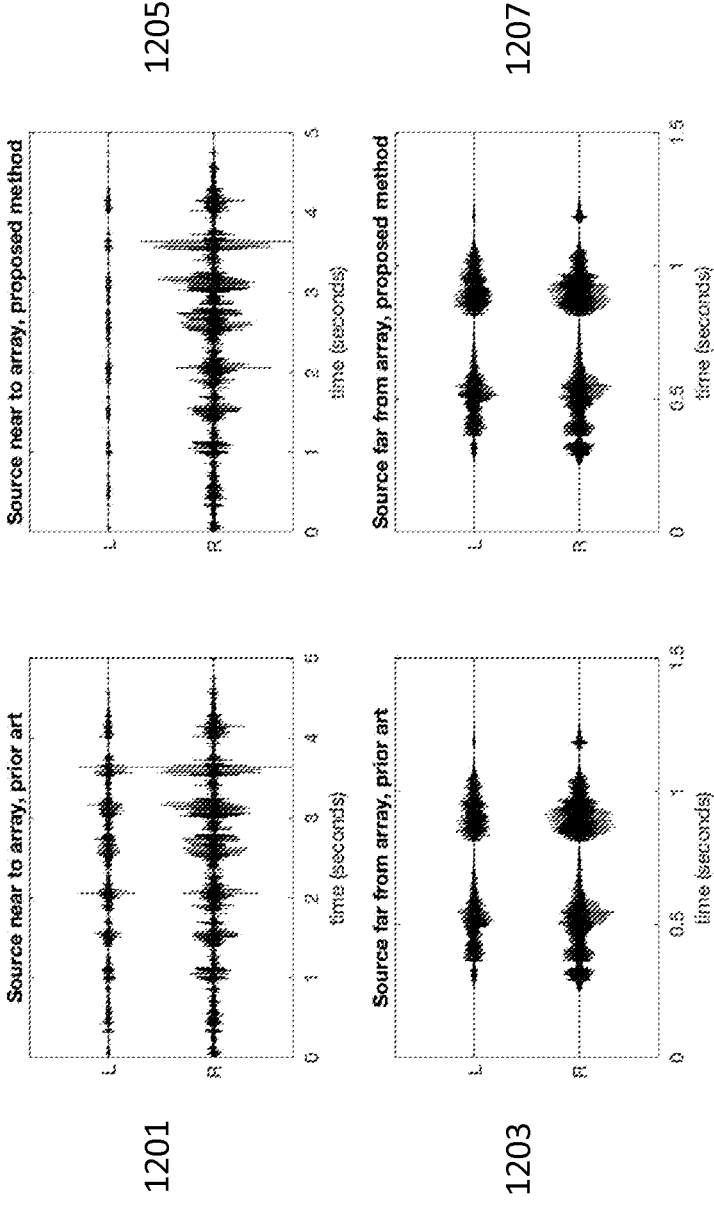
FIG. 12 shows graphs of the effect of near field processing according to some embodiments on a set of example audio signals.

With respect to FIG. 12 there is shown some graphs of an example near to array source waveform with conventional processing 1201 and processing according to some embodiments 1205. Furthermore FIG. 12 shows graphs of an example far from array source waveform with conventional processing 1203 and processing according to some embodiments 1207 which shows little difference.

The top row of FIG. 12 shows a situation where the sound is near to the mobile phone microphone array, approximately 10 cm at the right side. When compared to the waveform graph 1201, the processed waveform graph 1205 increases at this situation the inter-aural level difference which provides the improved perception of sound being near.

The bottom row of FIG. 12 shows a situation where the sound source is not near to the array, but approximately 2 meters at the right. In this situation the proposed method does not significantly affect the inter-aural level difference, which is appropriate for sounds not near to the array.

Figure 13:
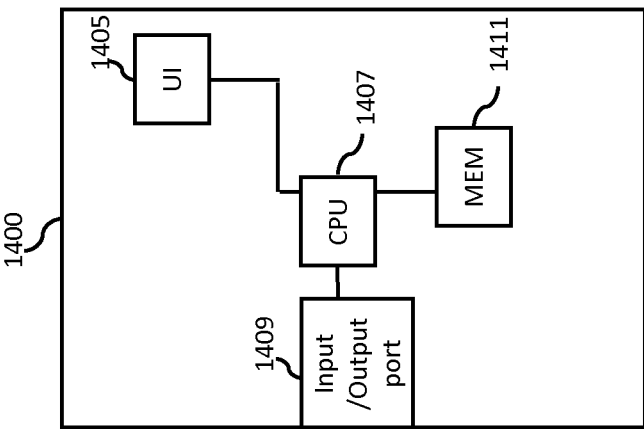
FIG. 13 shows schematically an example device suitable for implementing the apparatus shown.

With respect to FIG. 13 an example electronic device which may be used as the computer, encoder processor, decoder processor or any of the functional blocks described herein is shown. The device may be any suitable electronics device or apparatus. For example in some embodiments the device 1400 is a mobile device, user equipment, tablet computer, computer, audio playback apparatus, etc.

In some embodiments the device 1400 comprises at least one processor or central processing unit 1407. The processor 1407 can be configured to execute various program codes such as the methods such as described herein.

In some embodiments the device 1400 comprises a memory 1411. In some embodiments the at least one processor 1407 is coupled to the memory 1411. The memory 1411 can be any suitable storage means. In some embodiments the memory 1411 comprises a program code section for storing program codes implementable upon the processor 1407. Furthermore in some embodiments the memory 1411 can further comprise a stored data section for storing data, for example data that has been processed or to be processed in accordance with the embodiments as described herein. The implemented program code stored within the program code section and the data stored within the stored data section can be retrieved by the processor 1407 whenever needed via the memory-processor coupling.

In some embodiments the device 1400 comprises a user interface 1405. The user interface 1405 can be coupled in some embodiments to the processor 1407. In some embodiments the processor 1407 can control the operation of the user interface 1405 and receive inputs from the user interface 1405. In some embodiments the user interface 1405 can enable a user to input commands to the device 1400, for example via a keypad. In some embodiments the user interface 1405 can enable the user to obtain information from the device 1400. For example the user interface 1405 may comprise a display configured to display information from the device 1400 to the user. The user interface 1405 can in some embodiments comprise a touch screen or touch interface capable of both enabling information to be entered to the device 1400 and further displaying information to the user of the device 1400.

In some embodiments the device 1400 comprises an input/output port 1409. The input/output port 1409 in some embodiments comprises a transceiver. The transceiver in such embodiments can be coupled to the processor 1407 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA). The transceiver input/output port 1409 may be configured to transmit/receive the audio signals, the bitstream and in some embodiments perform the operations and methods as described above by using the processor 1407 executing suitable code.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media, and optical media.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus, comprising:
at least one processor; and
at least one memory storing instructions that, when executed with the at least one processor, cause the apparatus to:
obtain two or more audio signals, wherein the audio signals are associated with a microphone array;
obtain at least one value associated with an inter-channel difference based on the two or more audio signals;
obtain at least one direction associated with the two or more audio signals;
obtain at least one value associated with an inter-aural difference based at least on the at least one direction;
compare the at least one value associated with the inter-channel difference and the at least one value associated with the inter-aural difference;
determine at least one gain correction factor based on the comparison; and
generate, based on the determined gain correction factor applied to one or more of the obtained two or more audio signals, at least two output audio signals with controlling inter-aural level differences of the generated at least two output audio signals based on the at least one value associated with the inter-channel difference and the at least one value associated with the inter-aural difference, such that sounds nearer to the microphone array are reproduced with a higher inter-aural difference at the at least two output audio signals than other sounds, and such that the at least two output audio signals are configured to represent a more accurate distance of a sound source than the two or more audio signals.

2. The apparatus as claimed in claim 1, wherein the instructions, when executed with the at least one processor, cause the apparatus to:
generate at least two further audio signals based on the two or more audio signals and the at least one direction for the at least two or more audio signals; and
obtain the at least one value associated with the inter-aural difference based on the at least two further audio signals.

3. The apparatus as claimed in claim 2, wherein the instructions, when executed with the at least one processor, cause the apparatus to
determine:
at least one distance of the sound source;
generate the at least two output audio signals based on the at least two further audio signals and the comparison such that the at least two output audio signals are configured to represent the more accurate distance of the sound source; and
generate the at least two output audio signals based on the at least one distance of the sound source.

4. The apparatus as claimed in claim 2, wherein the instructions, when executed with the at least one processor, cause the apparatus to
determine a maximum of the at least one value associated with the inter-aural level difference and the at least one value associated with the inter-channel level difference.

5. The apparatus as claimed in claim 4, wherein the instructions, when executed with the at least one processor, cause the apparatus to:

modify the at least two further audio signals such that when the at least one value associated with the inter-channel level difference is larger than the at least one value associated with the inter-aural difference, the at least two further audio signals are modified based on the at least one value associated with the inter-channel level difference.

6. The apparatus as claimed in claim 1, wherein the instructions, when executed with the at least one processor, cause the apparatus to:

determine a head-related transfer function corresponding to the at least one direction associated with the two or more audio signals; and determine the at least one value associated with the inter-aural difference based on at least the determined head-related transfer function.

7. The apparatus as claimed in claim 1, wherein the instructions, when executed with the at least one processor, cause the apparatus to at least one of:

receive the two or more audio signals from two or more microphones of the microphone array; or receive two or more transport audio signals generated from the two or more audio signals.

8. The apparatus as claimed in claim 1, wherein the instructions, when executed with the at least one processor, cause the apparatus to:

determine:

at least one first energy value based on either one of the two or more audio signals associated with a left microphone, or a selection of the two or more audio signals associated with left microphones; and at least one second energy value based on either one of the two or more audio signals associated with a right microphone, or a selection of the two or more audio signals associated with right microphones.

9. The apparatus as claimed in claim 1, wherein the instructions, when executed with the at least one processor, cause the apparatus to:

determine:

at least one first energy value based on a tuning factor multiplied with either one of the two or more audio signals associated with a left microphone, or a selection of the two or more audio signals associated with left microphones; and at least one second energy value based on the tuning factor multiplied with either one of the two or more audio signals associated with a right microphone, or a selection of the two or more audio signals associated with right microphones.

10. The apparatus as claimed in claim 1, wherein the instructions, when executed with the at least one processor, cause the apparatus to:

determine:

at least one left channel binaural energy value; and at least one right channel binaural energy value.

11. The apparatus as claimed in claim 10, wherein the instructions, when executed with the at least one processor, cause the apparatus to:

determine which of at least one left and at least one right binaural channel has a higher energy; and compare the binaural energy value of the determined channel and the energy value based on either one of the two or more audio signals associated with a determined channel microphone, or a selection of the two or more audio signals associated with determined channel microphones.

12. The apparatus as claimed in claim 11, wherein the instructions, when executed with the at least one processor, cause the apparatus to:

determine at least one further gain correction factor for a left or right further audio signal based on the comparison.

13. The apparatus as claimed in claim 12, wherein the instructions, when executed with the at least one processor, cause the apparatus to:

determine a left further audio signal correction factor of a square root of a ratio between an energy value of a left channel and an energy value of an associated left binaural channel; and determine a right further audio signal correction factor of a square root of a ratio between an energy value of a right channel and an energy value of an associated right binaural channel.

14. The apparatus as claimed in claim 1, wherein the at least one value associated with the inter-channel difference is at least one of:

an energy of the two or more audio signals;

an amplitude of the two or more audio signals;

a value related to an amount of sound based on the two or more audio signals;

a value related to a relative amount of sound at the two or more audio signals;

at least one inter-channel energy level difference; or at least one inter-channel amplitude level difference.

15. The apparatus as claimed in claim 1, wherein the at least one inter-aural difference is at least one of:

a binaural energy value;

a binaural amplitude value;

a value related to an amount of binaural sound;

a value related to a relative amount of binaural sound;

at least one inter-aural energy level difference; or at least one inter-aural amplitude level difference.

16. The apparatus as claimed in claim 1, wherein the instructions, when executed with the at least one processor, cause the apparatus to at least one of:

obtain spatial metadata associated with the two or more audio signals;

analyse the two or more audio signals to determine the spatial metadata; or receive the spatial metadata associated with the two or more audio signals.

17. The apparatus as claimed in claim 16, wherein the spatial metadata associated with the two or more audio signals comprises at least one of:

a direction value; or a value indicating a directionality related to the two or more audio signals.

18. The apparatus as claimed in claim 1, wherein the instructions, when executed with the at least one processor, cause the apparatus to generate binaural output audio signals.

19. A method for an apparatus comprising:

obtaining two or more audio signals, wherein the audio signals are associated with a microphone array;

obtaining at least one value associated with an inter-channel difference based on the two or more audio signals;

obtaining at least one direction associated with the two or more audio signals;

obtaining at least one value associated with an inter-aural difference based at least on the at least one direction;

comparing the at least one value associated with the inter-channel difference and the at least one value associated with the inter-aural difference;

determining at least one gain correction factor based on the comparison; and generating, based on the determined gain correction factor applied to one or more of the obtained two or more audio signals, at least two output audio signals with controlling inter-aural level differences of the generated at least two output audio signals based on the at least one value associated with the inter-channel difference and the at least one value associated with the inter-aural difference, such that sounds nearer to the microphone array are reproduced with a higher inter-aural difference at the at least two output audio signals than other sounds, and such that the at least two output audio signals are configured to represent a more accurate distance of a sound source than the two or more audio signals.

20. A non-transitory computer-readable medium comprising instructions stored thereon for performing at least the following:

obtaining two or more audio signals, wherein the audio signals are associated with a microphone array;

obtaining at least one value associated with an inter-channel difference based on the two or more audio signals;

obtaining at least one direction associated with the two or more audio signals;

obtaining at least one value associated with an inter-aural difference based at least on the at least one direction;

comparing the at least one value associated with the inter-channel difference and the at least one value associated with the inter-aural difference;

determining at least one gain correction factor based on the comparison; and generating, based on the determined gain correction factor applied to one or more of the obtained two or more audio signals, at least two output audio signals with controlling inter-aural level differences of the generated at least two output audio signals based on the at least one value associated with the inter-channel difference and the at least one value associated with the inter-aural difference, such that sounds nearer to the microphone array are reproduced with a higher inter-aural difference at the at least two output audio signals than other sounds, and such that the at least two output audio signals are configured to represent a more accurate distance of a sound source than the two or more audio signals.

* * * * *